United States Patent
Beaver et al.

(10) Patent No.: US 9,580,096 B2
(45) Date of Patent: Feb. 28, 2017

(54) TOTE TRANSPORT

(71) Applicant: San Jamar, Inc., Elkhorn, WI (US)

(72) Inventors: Aaron Beaver, Delavan, WI (US); Michael J. Muenstermann, Woodbury, MN (US); Bernie Ziebart, Pewaukee, WI (US); Orlando Ochoa, Walnut, CA (US)

(73) Assignee: San Jamar, Inc., Elkhorn, WI (US)

(*) Notice: Subject to any disclaimer, the term of this patent is extended or adjusted under 35 U.S.C. 154(b) by 0 days.

(21) Appl. No.: 14/773,972

(22) PCT Filed: Mar. 13, 2014

(86) PCT No.: PCT/US2014/025396
§ 371 (c)(1),
(2) Date: Sep. 9, 2015

(87) PCT Pub. No.: WO2014/151298
PCT Pub. Date: Sep. 25, 2014

(65) Prior Publication Data
US 2016/0031467 A1 Feb. 4, 2016

Related U.S. Application Data

(63) Continuation of application No. 13/842,058, filed on Mar. 15, 2013, now Pat. No. 9,150,234.

(51) Int. Cl.
*B62B 1/14* (2006.01)
*B62B 1/26* (2006.01)
(Continued)

(52) U.S. Cl.
CPC .............. *B62B 3/104* (2013.01); *B62B 1/125* (2013.01); *B62B 3/02* (2013.01); *B62B 3/10* (2013.01);
(Continued)

(58) Field of Classification Search
CPC .............. B62B 3/02; B62B 3/022; B62B 3/10; B62B 3/12; B62B 3/04; B62B 3/104
(Continued)

(56) References Cited

U.S. PATENT DOCUMENTS 2,422,862 A * 6/1947 Stottrup .................... B62B 3/12
186/62
2,506,471 A 5/1950 Siegal
(Continued)

FOREIGN PATENT DOCUMENTS

JP 3086171 7/2000
WO 2010/127402 11/2010

OTHER PUBLICATIONS

Magna Cart Personal Hand Truck, MCX Item Model Number and Part Number.
Rubbermaid Ice Cart—100 lb.

*Primary Examiner* — J. Allen Shriver, II
*Assistant Examiner* — Travis Coolman
(74) *Attorney, Agent, or Firm* — Boyle Fredrickson, S.C.

(57) ABSTRACT

A tote transport assembly that includes a base, a handle, a partition, and a lid. The base includes a plurality of wheels that facilitate vertical or tipped transportation of the ice cart through an environment. The base and the partition and the partition and the lid are shaped to facilitate a stacked and secure cooperation of multiple containers, totes, or buckets with the cart assembly. The partition and the lid movably cooperate with the handle to facilitate secure and sanitary cooperation of the containers with the cart assembly as well as convenient and expedient filling and emptying of the discrete containers. The stacked orientation of the multiple containers and alternate transport modalities provide a compact assembly for conveniently transporting loaded or unloaded containers throughout even tight quartered environments and in a manner that reduces the effort associated with such activities.

20 Claims, 20 Drawing Sheets

(51) Int. Cl.
  *B62B 3/04* (2006.01)
  *B62B 3/12* (2006.01)
  *B62B 3/10* (2006.01)
  *B62B 3/02* (2006.01)
  *B62B 1/12* (2006.01)
  *B62B 5/06* (2006.01)

(52) U.S. Cl.
  CPC .. *B62B 1/12* (2013.01); *B62B 3/12* (2013.01); *B62B 5/067* (2013.01); *B62B 2202/02* (2013.01)

(58) Field of Classification Search
  USPC ....... 280/47.34, 47.35, 47.371, 47.17, 47.19, 280/47.315, 79.11, 79.5, 35, 638
  See application file for complete search history.

(56) References Cited

U.S. PATENT DOCUMENTS

| | | | |
|---|---|---|---|
| 2,869,885 A * | 1/1959 | Doyle, Jr. | B60B 37/10 280/47.17 |
| 3,052,484 A * | 9/1962 | Huffman | B62B 1/12 280/47.12 |
| 3,326,571 A * | 6/1967 | Levine | B62B 3/027 280/641 |
| 3,399,903 A * | 9/1968 | Bailey | B62B 3/12 248/146 |
| 3,507,413 A | 4/1970 | Hobson | |
| 3,554,573 A | 1/1971 | Miller | |
| 3,815,933 A | 6/1974 | Olson | |
| 3,930,630 A * | 1/1976 | Wulff | A47L 9/325 15/352 |
| 4,754,985 A | 7/1988 | Im et al. | |
| 4,799,699 A * | 1/1989 | Berfield | B62B 5/0083 15/323 |
| 4,856,959 A | 8/1989 | Tabayashi | |
| 5,340,136 A | 8/1994 | MacNeil et al. | |
| 5,556,076 A | 9/1996 | Jacquay | |
| 5,558,359 A * | 9/1996 | Phears | B62B 3/12 280/47.371 |
| 5,626,352 A * | 5/1997 | Grace | B62B 1/12 280/47.29 |
| 5,641,170 A * | 6/1997 | Helm | A47F 5/108 280/30 |
| 5,707,030 A * | 1/1998 | Roman | B62B 1/26 248/98 |
| 5,758,888 A * | 6/1998 | Burgan | B62B 5/0083 220/908 |
| 5,806,867 A | 9/1998 | Hampton | |
| 5,816,604 A * | 10/1998 | Hsieh | B62B 3/02 280/33.997 |
| 5,944,474 A | 8/1999 | Cummins et al. | |
| 6,095,537 A | 8/2000 | Cozza et al. | |
| 6,135,467 A | 10/2000 | Tagariello | |
| 6,209,891 B1 | 4/2001 | Herrmann | |
| RE37,350 E | 9/2001 | Stephan | |
| 6,386,559 B1 | 5/2002 | Souza | |
| 6,454,281 B1 * | 9/2002 | Pearson | B62B 1/125 280/47.26 |
| 6,488,293 B1 * | 12/2002 | Mitchell | B62B 3/104 280/47.34 |
| 6,497,423 B1 * | 12/2002 | Perelli | B62B 3/10 280/47.34 |
| 6,729,631 B2 | 5/2004 | Trine et al. | |
| 6,851,563 B1 * | 2/2005 | Lipari | A47F 7/283 211/59.4 |
| 6,893,032 B2 | 5/2005 | Kershaw | |
| 7,063,339 B2 * | 6/2006 | Jarko | B62B 1/14 280/47.19 |
| 7,066,476 B2 | 6/2006 | Elden | |
| 7,178,812 B1 | 2/2007 | Bryan | |
| 7,207,576 B1 | 4/2007 | Ibarra | |
| 7,246,805 B2 | 7/2007 | Neal et al. | |
| 7,273,216 B1 * | 9/2007 | Hohrman | B62B 1/264 280/47.26 |
| 7,296,816 B2 | 11/2007 | Wilnau | |
| 7,306,243 B2 | 12/2007 | Van Horn et al. | |
| 7,364,172 B1 * | 4/2008 | Archer | B62B 3/104 220/625 |
| 7,416,196 B2 | 8/2008 | Brown | |
| 7,591,627 B2 | 9/2009 | Westover | |
| 7,597,527 B2 | 10/2009 | Rodriguez | |
| 7,628,406 B1 | 12/2009 | Thomas et al. | |
| 7,703,776 B1 | 4/2010 | Nugent | |
| 7,740,251 B2 | 6/2010 | Simmons | |
| 7,744,101 B2 | 6/2010 | Robbins et al. | |
| 7,758,055 B2 * | 7/2010 | Martinez | B62B 5/04 188/29 |
| 7,784,802 B2 | 8/2010 | White | |
| 7,954,830 B2 | 6/2011 | Begin et al. | |
| 8,042,829 B2 | 10/2011 | Hailston et al. | |
| 8,061,723 B1 * | 11/2011 | Carroll | A63B 69/0002 280/47.26 |
| 8,069,939 B1 | 12/2011 | Metzler | |
| 8,128,106 B2 | 3/2012 | Hollins et al. | |
| 8,256,778 B1 | 9/2012 | Morad et al. | |
| 8,262,108 B2 | 9/2012 | Al-Hasan | |
| 8,276,692 B1 | 10/2012 | Nwaeke | |
| 8,327,659 B2 | 12/2012 | Winkler et al. | |
| 8,365,944 B2 | 2/2013 | Vanderberg et al. | |
| 8,366,125 B2 | 2/2013 | Loomans | |
| 8,376,376 B2 | 2/2013 | Thibault | |
| 8,528,918 B2 * | 9/2013 | Macias | B62B 3/02 280/47.35 |
| 8,789,836 B2 * | 7/2014 | Umbro | B62B 1/042 280/47.26 |
| 2003/0025303 A1 | 2/2003 | Perelli et al. | |
| 2005/0040616 A1 | 2/2005 | Cheng | |
| 2008/0084041 A1 * | 4/2008 | Dukes | B62B 3/04 280/79.5 |
| 2008/0191437 A1 | 8/2008 | Staub | |
| 2009/0079144 A1 | 3/2009 | Satorius | |
| 2010/0124476 A1 | 5/2010 | Berlinger | |
| 2010/0140891 A1 | 6/2010 | Lin | |
| 2010/0294404 A1 | 11/2010 | Anderson | |
| 2013/0020776 A1 * | 1/2013 | Taranto | B62B 3/10 280/47.35 |
| 2013/0181418 A1 * | 7/2013 | Burton | B62B 1/12 280/47.19 |

* cited by examiner

TOTE TRANSPORT

CROSS REFERENCE TO RELATED APPLICATIONS

This application is a national stage application under 35 U.S.C. §371 of PCT Application PCT filed on Mar. 13, 2014 and which claims priority to U.S. Non-provisional patent application Ser. No. 13/842,058 filed on Mar. 15, 2013 both titled "Tote Transport" and the disclosures of which is are incorporated herein.

FIELD OF THE INVENTION

The present invention relates to a cart for transporting flowable materials, and more particularly, to a cart that is constructed to securely cooperate with one or more totes and has a compact construction that improves transportation of the cart through tight quarters.

BACKGROUND OF THE INVENTION

A number of environments require the conveyance of ice or other flowable materials from a bulk storage or generation area to various areas associated with use or consumption of the material. For purposes of this disclosure, and for ease of reference, ice and ice storage will be used by way of example. However, this is not meant to limit the application of the present invention to ice or any other particular flowable material or storage therefor.

Commonly, commercial food and beverage and hospitality environments require the transport of ice from a bulk source to locations more conducive to the display of food stuffs and beverage dispensing activities. Transportation of the ice requires maintaining the sanitation of the ice, transporting the ice in a manner that limits or reduces unintended spills of the ice product, and conveying the ice in a convenient manner to limit the physical requirements or efforts of staff responsible for replenishing or distributing the ice. The movement of ice in such environments also commonly requires consideration as to the storage and movement of the carts, totes, or buckets throughout the respective environments due to the limited space available in the behind the scenes areas, such as the kitchen areas, associated with many such environments.

Most commonly, ice is communicated or transported throughout the environment by staff personnel who repeatedly travel to and fro between the bulk source and the vicinity of the use or consumption activity with one or more ice totes or buckets being manually carried. The size of the container, the physical capability of staff, spatial tolerances along the available route(s), ambient conditions, and the usage or rate of consumption of the ice all contribute to the number of trips as well as staff required to adequately replenish the ice.

In an effort to expedite transportation, sanitation, and safety of moving ice throughout the use environment and mitigate or reduce the physical capabilities required to effectuate such activities, others provide wheeled carts that are configured to transport multiple ice bins or totes per trip. While such systems allow a single staff person to transport greater quantities of ice that can commonly by carried by the same staff person, such systems are not without their respective drawbacks. One such system includes a wheeled platform that is shaped to cooperate with a plurality of generally rectilinear ice buckets. The multiple row and column orientation of the various discrete ice buckets requires a substantially large footprint that makes the cart generally ill suited or even unusable for use in the somewhat cramped quarters or passages associated with many behind the scenes areas, such as kitchen spaces, associated with such environments.

Such transport systems can also dramatically increase the operating costs and sanitation issues associated with implementation of such systems. Food and drink stuffs are preferably communicated in a covered manner to limit contamination of the materials during the transport activity. Where commodities such as ice are transported by placing open containers on a cart that is moved in close proximity to counters or the like associated with food preparation but at elevations generally below the working surface associated with the counter, the inadvertent introduction of food stuffs into full or empty ice containers as they traverse past the food preparation stations is a risk. Close quarters along the transportation path has the tendency to increase the risk associated with inadvertertent contamination of the ice conveyance system.

In view of the variety of issues discussed above, it should be appreciated that the sanitary condition of ice, safety of the worker, and the efficiency of the transport of such commodities remain a predominant issue in most if not all commercial use and consumption environments. Accordingly, a need exists for a material transport system that reduces the potential for contamination of the flowable material via unintended contact or introduction of foreign materials during conveyance activities, provides a conveyance vehicle that has a compact footprint and multiple modes of transport that improve the tolerance for using the cart in confined or otherwise crowded environments, and improves the efficiency and safety with which staff or other personnel can convey the ice throughout the respective environment.

SUMMARY OF THE INVENTION

The present invention discloses a tote transport device that overcomes one or more of the drawbacks mentioned above. An assembly according to one aspect of the invention includes a base, a handle, a partition, and a lid. The base includes a plurality of wheels that facilitate vertical or tipped transportation of the tote transport device through an environment. The base and the partition and the partition and the lid are shaped to facilitate a stacked and secure cooperation of multiple ice containers, totes, or buckets with the cart assembly. The partition and the lid movably cooperate with the handle or back support to facilitate secure and sanitary cooperation of the totes with the cart assembly as well as convenient and expedient filling and emptying of the discrete containers. The stacked orientation of the multiple totes and alternate transport modalities provide a compact assembly for conveniently transporting loaded or unloaded containers throughout even tight quartered environments and in a manner that reduces the effort associated with such activities.

Another aspect of the invention is directed to a cart that includes a base having a generally triangular shape and an upper facing surface and downward facing surface. An axle is engaged with the base and extends along a side of the generally triangular shape of the base. A first wheel is secured to a first end of the axle and a second wheel is secured to a second end of the axle. A caster wheel, preferably of the swivel type, is secured to the base at a point of the generally triangular shape of the base that is not associated with the axle. A handle is secured to the base proximate the axle and extends in an upward direction away from the base. A first cap is pivotably connected to the handle and has a first side that is shaped to cooperate with an open end of a first ice bucket such that the first ice bucket can be selectively captured between the upper facing surface of the base and first side of the first cap. A second cap is pivotably connected to the handle or back support at a location that is offset from the first cap. The second cap is shaped to cooperate with an open end of a second ice bucket such that the second ice bucket can be selectively captured between a first cap and the second cap at a position vertically above the first ice bucket.

Another aspect of the invention that is usable with one or more of the features or aspects disclosed above is directed to a cart having a base secured to a lower end of a telescopic handle assembly. An axle that is associated with a pair of wheels is secured to the base. A caster wheel, preferably of the swivel type, is secured to the base and offset from the axle such that the pair of wheels and the caster wheel support the base in a horizontal orientation when the pair of wheels and caster wheel are in contact with a floor surface and the telescopic handle assembly extends in a generally vertical orientation relative to the base. A top surface of the base is shaped to cooperate with an ice bucket. The cart includes a lid, that pivotably cooperates with the telescopic handle assembly and is movable between a first position and a second position. The lid includes a first surface that faces the base such that the lid and the base cooperate with an ice tote such that the ice bucket can be engaged with or removed from the base when the lid is oriented in one of the first position and the second position and the lid covers an opening of an ice tote supported by the base and is oriented to support another ice tote above the lid when the lid is oriented in the other of the first position and the second position.

Another aspect of the invention that is usable with one or more of the above features or aspects is directed to a cart assembly that removably cooperates with a plurality of totes. The cart assembly includes a base having a plurality of wheels, wherein at least one of the wheels is further defined as a caster wheel and preferably a swivel caster wheel. A handle extends in an upward direction from the base and a lid cooperates with the handle and is offset from base. A partition cooperates with the handle and defines a cover for a first container disposed between the base and the partition and another base for supporting a second container disposed between the partition and the lid such that the first container and the second container are secured in a stacked orientation that extends in a longitudinal direction along the handle between the base and the lid with the partition disposed between a respective one of the first and second containers.

Various other aspects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications. Other features, aspects, and advantages of the invention made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF PARTICULAR EMBODIMENTS

Figure 1:
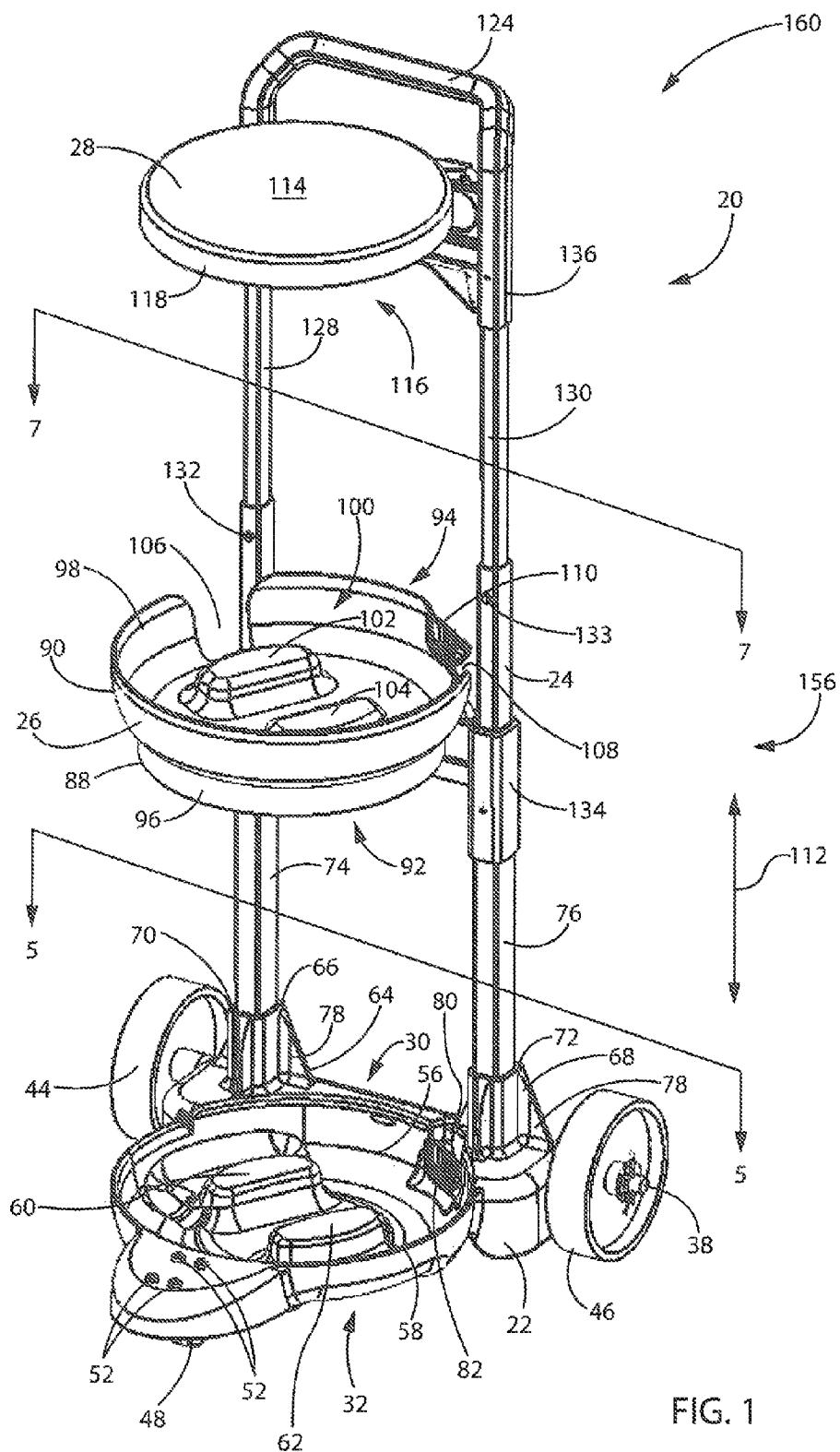
FIG. 1 is a top front side perspective view of a tote transport according to one embodiment of the present invention.

FIG. 1 is a perspective view of a cart, cart assembly, or tote transport 20 according to the preferred embodiment of the present invention. Although described herein as an ice cart or cart associated with conveying quantities of ice, it is appreciated that the cart as disclosed herein is suitable for conveyance of various commodities other than ice. Ice cart 20 includes a base 22, a handle or handle assembly 24, a first lid or partition 26, and another lid 28 wherein base 22, partition 26 and lid 28 are offset along a longitudinal axis of handle assembly 24 and facilitate stacking of multiple containers as is described further below. Preferably, tote transport/ice cart 20 is provided in a generally compact form factor for facilitating translation of the ice cart through cramped quarters in a manner that cannot be achieved with other prior art ice cart assemblies.

Figure 2:
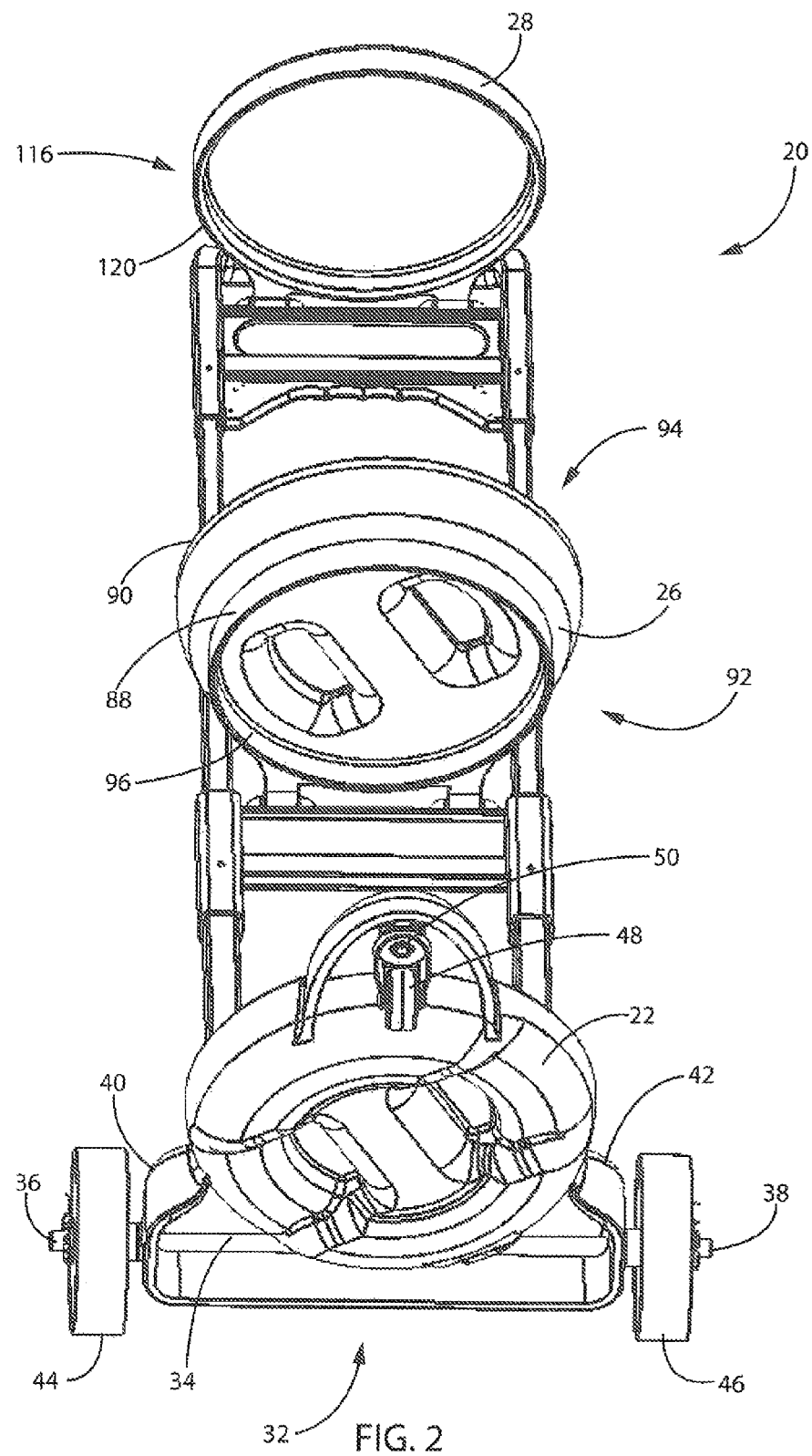
FIG. 2 is bottom perspective view of a tote transport shown in FIG. 1.
Figure 3:
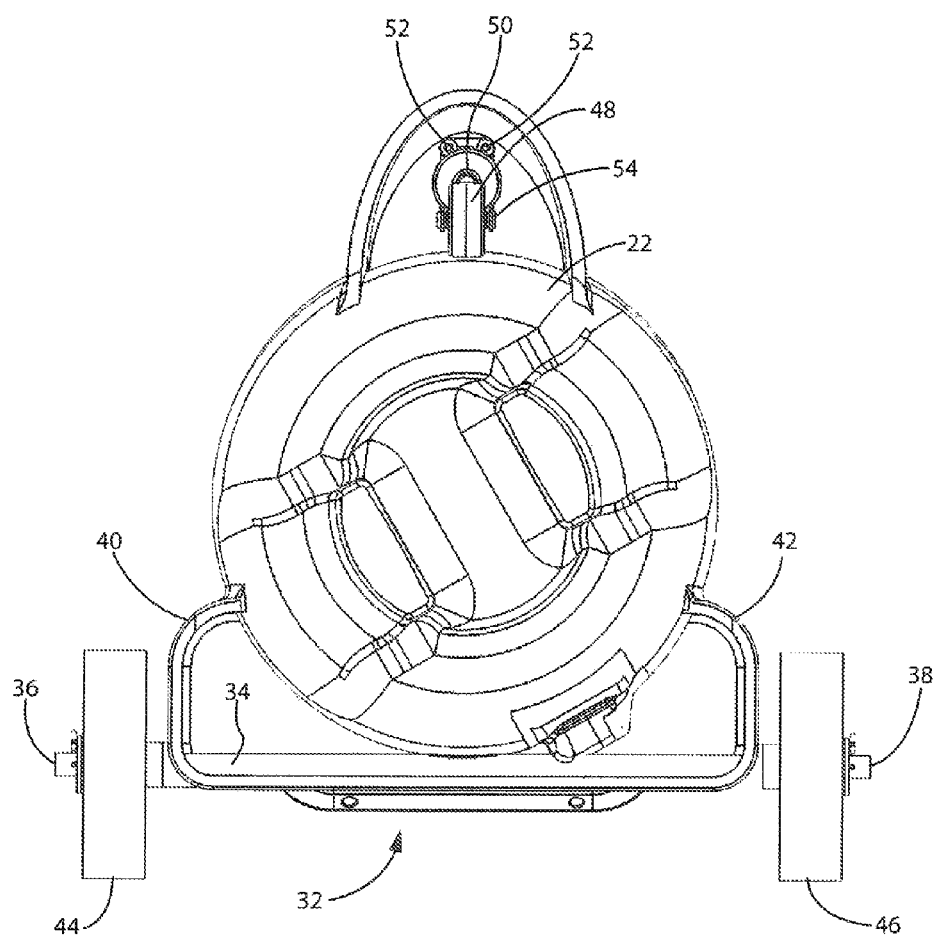
FIG. 3 is a bottom plan view of a tote transport shown in FIG. 1.
Figure 19:
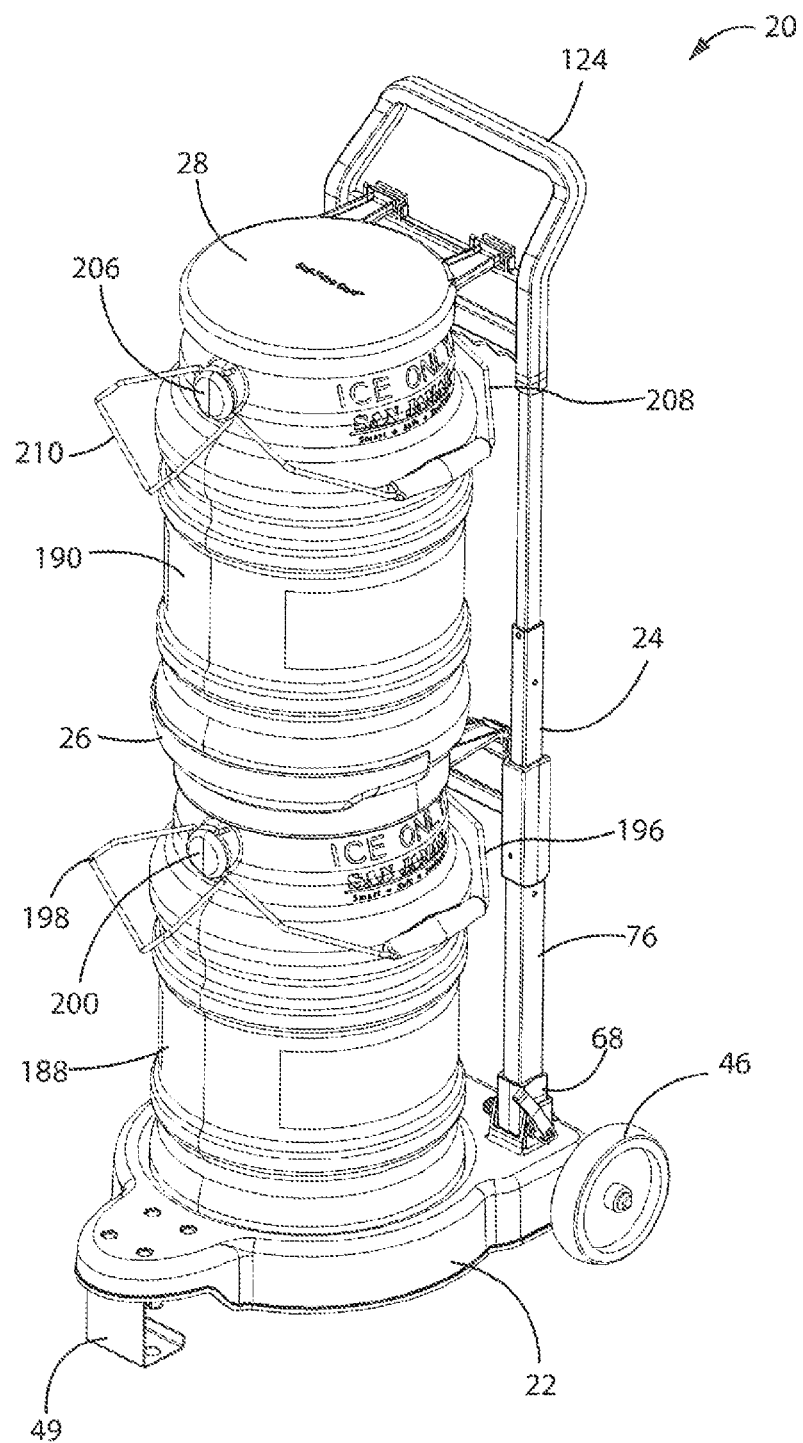
FIGS. 19 and 20 show various views of a tote transport having an alternate base construction.
Figure 20:
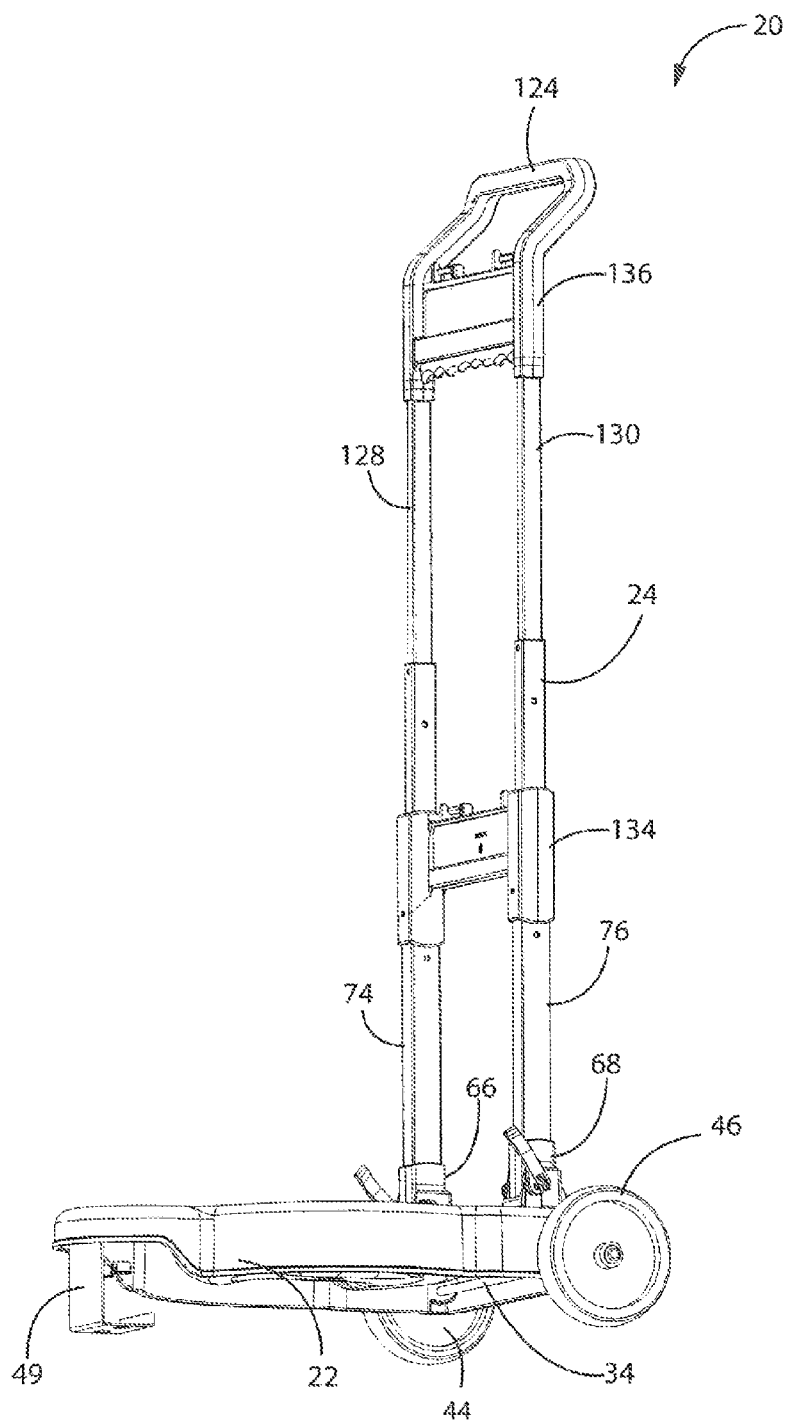

Referring to FIGS. 1-3, base 22 includes a first or upwardly facing surface or side 30 and a second or downwardly facing side 32. An axle 34 cooperates with base 22 and includes a first end 36 and a second end 38 that extended beyond opposite respective sides 40, 42 of base 22. A respective first and second wheel 44, 46 cooperate with the alternate ends 36, 38 of axle 34 although it is appreciated that wheels 44, 46 could be independently secured to base 22. A third wheel or a caster wheel 48 is also secured to base 22 and is offset from axle 34 and wheels 44, 46 associated therewith. Preferably, caster wheel 48 is a swivel caster that is constructed to rotate about a pivot 50 associated therewith. Alternatively, it is appreciated that caster wheel 48 could be provided as a support post 49 (as shown in FIGS. 19 and 20) with the understanding that such a configuration will have a more limited functionality with respect to movement of ice cart 20 when in a fully vertical orientation as disclosed further below. Alternatively, it is appreciated that the more forward oriented support associated caster wheel 48 or post 49 could be provided, as two caster wheels. In such a configuration it is appreciated that the two caster wheels would be laterally offset from the centerline associated with caster wheel 48 and post 49.

Preferably, a plurality of fasteners 52 secure caster wheel 48 to base 42. Caster wheel 48 is preferably constructed to include a pivot 50 such that wheel 48 can rotate about a vertically oriented axis so as to manipulate an orientation of an axle 54 of caster wheel 48 relative to base 22. As shown in FIG. 3, wheels 44, 46 and caster wheel 48 are oriented in a generally triangular shape that generally mimics a triangular shape of base 42 such that wheels 44, 46, 48 are oriented at respective corners associated with a triangular shape of base 22. Referring briefly to FIG. 19, it is appreciated that post 49 and wheels 44, 46 are positioned in a similar orientation. Regardless of the type or orientation of the ground facing supports, handle assembly 24 is preferably positioned relative to base 22 so as to extend in a generally upward direction that is substantially aligned with axle 34. As used herein, the rearward portion of ice cart 20 is associated with the location of a user relative to ice cart 20. The downward and upward directions are associated with vertical gravitational directions although it is appreciated that ice cart 20 can be moved in both forward, rearward, and turning directions relative to the upward and downward directions.

Figure 4:
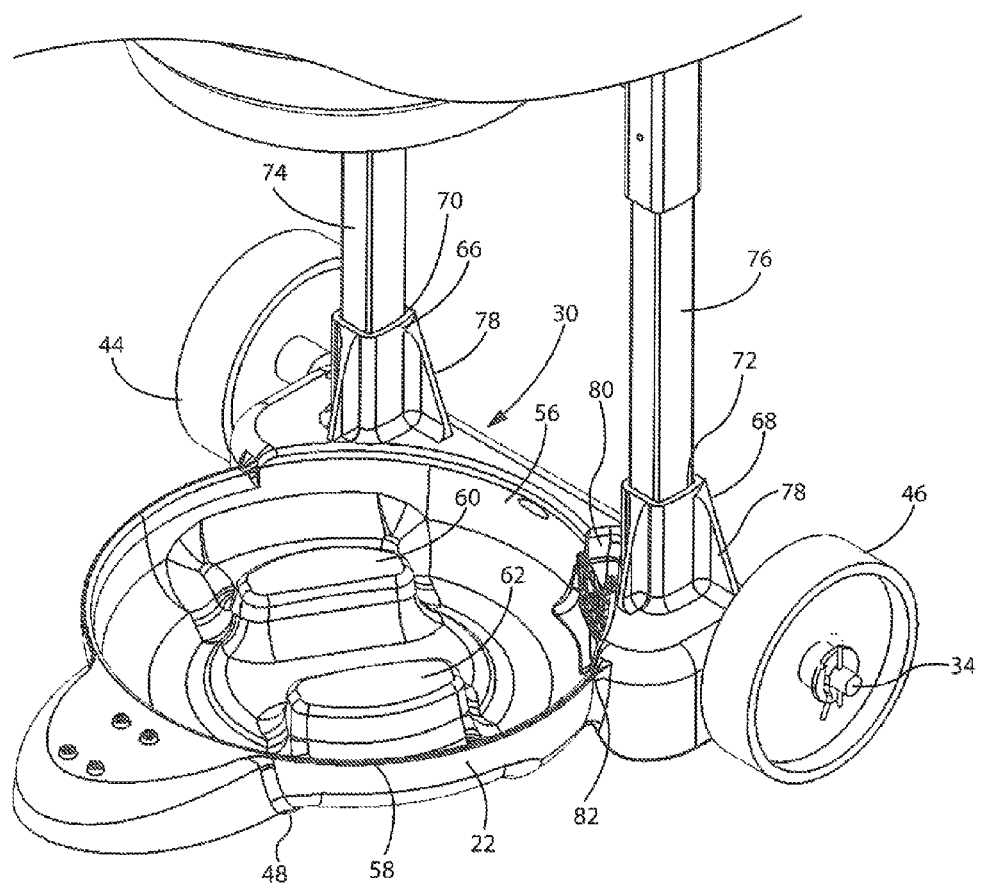
FIG. 4 is a front side perspective view of a base portion of a tote transport shown in FIG. 1.
Figure 5:
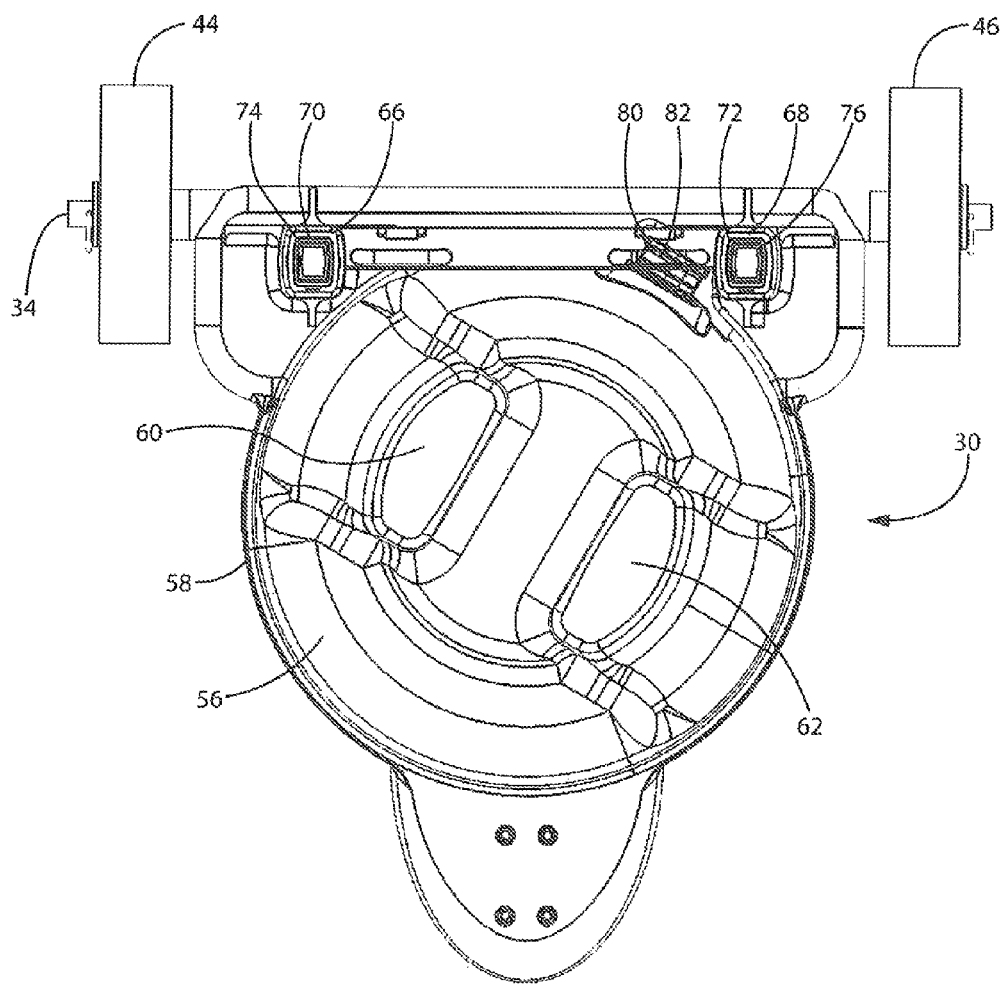
FIG. 5 is a cross section view of the ice cart taken along line 5-5 shown in FIG. 1 and shows a top side plan view of the base of the a tote transport.

Referring to FIGS. 1, 4, and 5, upward facing side 30 of base 22 includes a container receptacle 56 that is defined by a perimeter edge 58 formed by base 22. Preferably, one or more projections 60, 62 extend into receptacle 56 and are shaped and oriented to cooperate with a bottom surface of an ice bin, tote or bucket as described further below with the respective FIGS. 12-15. Projections 60, 62 are associated with cooperating respective hand holds formed in a bottom side of some commercially available ice buckets. Projections 60, 62 are preferably oriented to orient the respective ice buckets so that ice cart 20 does not interfere with other structures, such as handles or hangers, associated with the respective ice buckets. Such projections may be modified to cooperate with other types of totes or eliminated altogether.

A rearward oriented portion 64 of base 22 includes one or more bosses 66, 68 that each define a cavity 70, 72 configured to slidably cooperate with a tube or tubular portions 74, 76 associated with handle assembly 24. Bosses 66, 68 are laterally offset relative to a centerline of base 22 so as to be proximate wheels 44, 46. Bosses 66, 68 can further include one or more optional gussets 78 associated with providing a robust interaction of tubular portion 74, 76 with base 22 of ice cart 20. It is appreciated that tubular portions 74, 76 of handle assembly 24 can pivotally or removably cooperate with base 22 or be more permanently secured thereto. The movable or removable interaction between handle assembly 24 and base 22 is envisioned as improving the collapsibility of ice cart 20 when not in use so as to reduce the spatial requirements associated with storage of the same.

Base 22 can also include one or more optional cutouts 80 facilitating cooperation of an optional catch or optional hanger 82 associated with a container supported by base 22. Such an optional catch can improve the robustness of the maintenance of the containers relative to ice cart 20. An optional hanger is envisioned to facilitate the hanging of the containers in an inverted orientation to facilitate drainage and/or air drying of the containers when not in use.

Referring to FIGS. 1, 2, 6, and 7, partition 26 includes a lid portion 88 and a base portion 90 that are directed to opposite elevational sides of partition 26. That is, lid portion 88 is associated with a downward facing surface or side 92 of partition 26 whereas base portion 90 is associated with an upward facing surface or side 94 of partition 26. Lid portion 88 of partition 26 includes a lip 96 that is shaped to slidably cooperate with an open end of an ice bucket or other container disposed between base 22 and partition 26. Preferably, lid portion 88 sealingly cooperates with the open end of a container engaged therewith so as to facilitate the sealed transportation of liquids with ice cart 20.

Base portion 90 of partition 26 includes an upstanding perimeter edge 98 that extends about at least a portion of a perimeter of base portion 90 of partition 26. Base portion 90 defines a container cavity or receptacle 100 that is generally circumscribed by edge 98. One or more projections or protrusions 102, 104 preferably extend into receptacle 100 and are also shaped and oriented to cooperate with a bottom surface of an ice container or bucket associated with upward facing side 94 of partition 26 in a manner similar to base 22. Edge 98 preferably includes one or more cutouts 106 formed therein. As described further below with respect to FIGS. 9 and 10, cutouts 106, 108 are shaped and positioned to allow partition 26 to pivotably cooperate with handle assembly 24 in a manner that allows a portion of handle assembly 24 to translate into the void associated with cutouts 106, 108.

Figure 6:
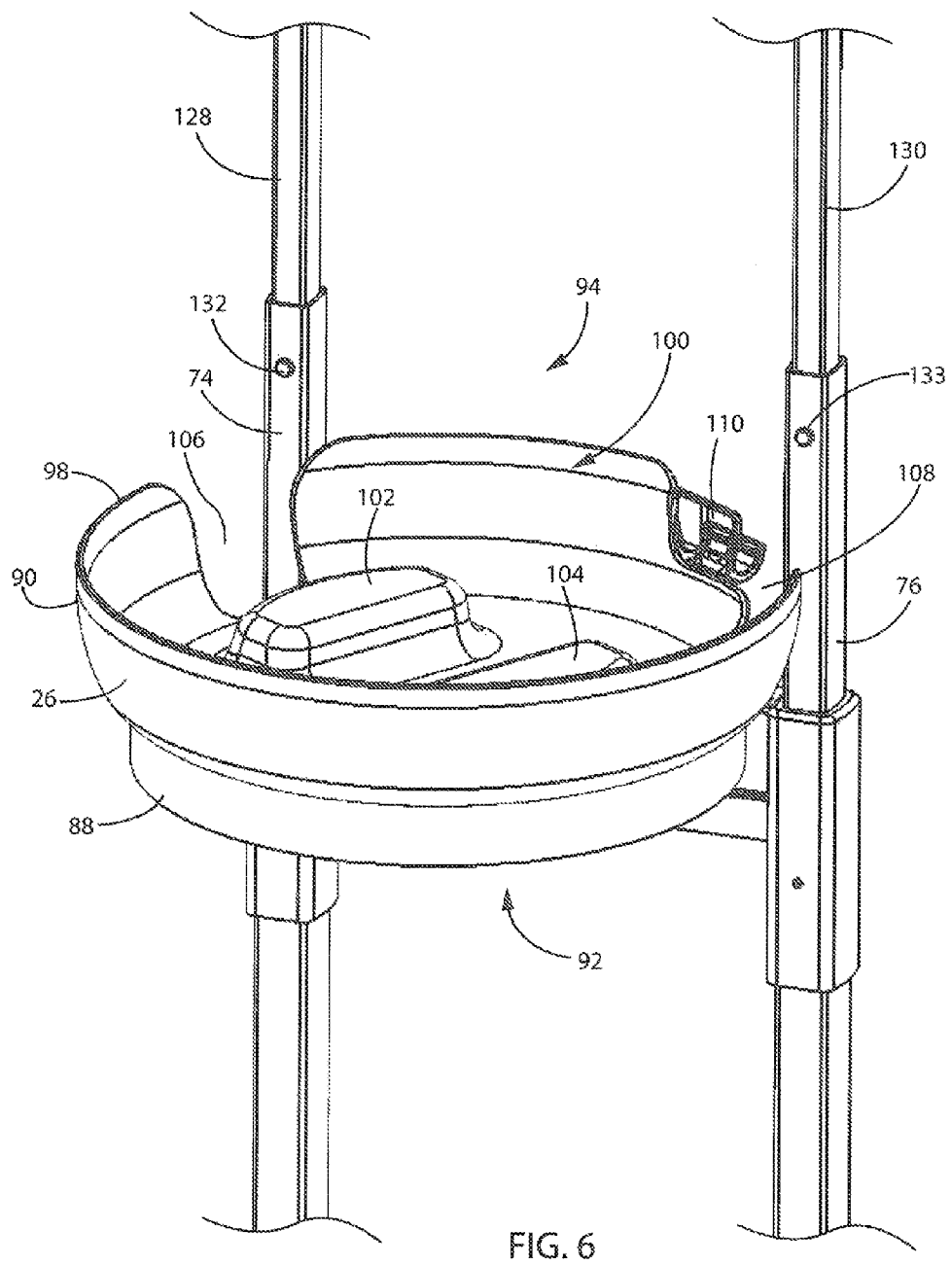
FIG. 6 is a top front side perspective view of a partition of the tote transport shown in FIG. 1.
Figure 7:
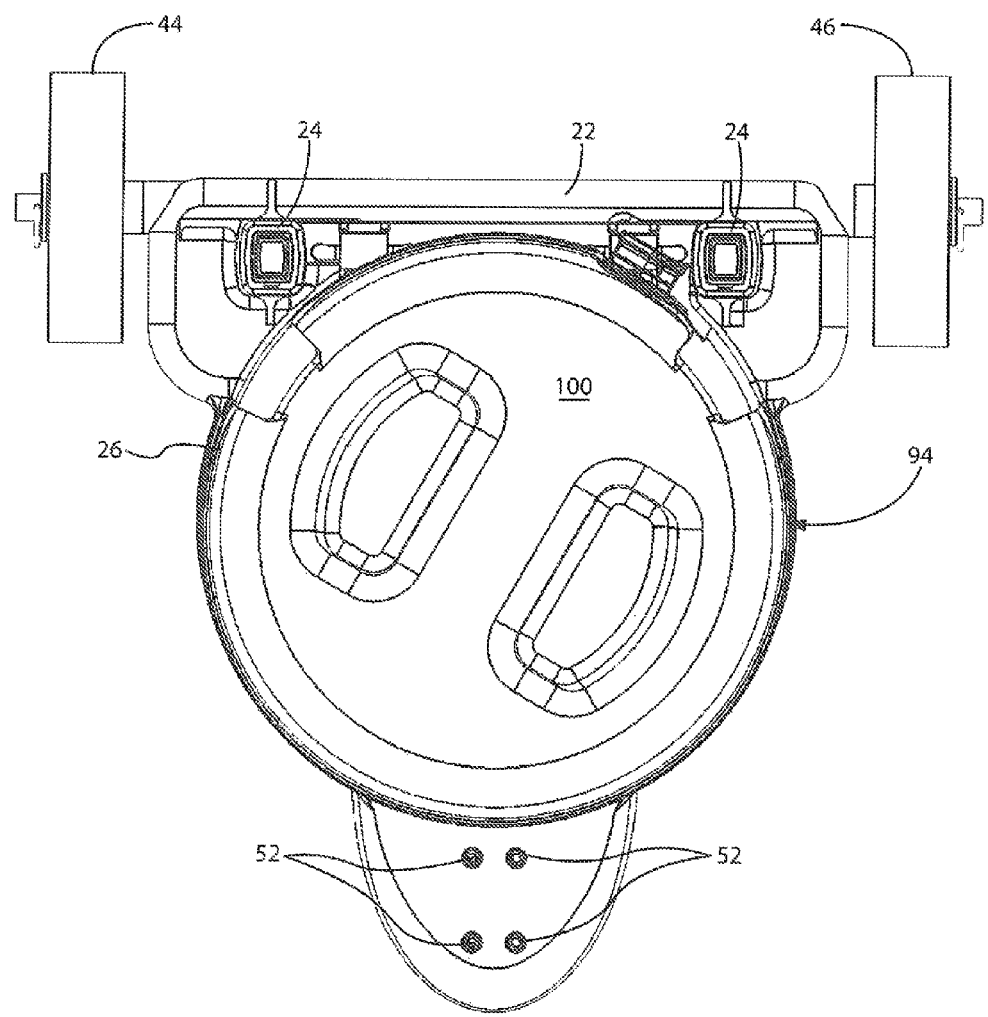
FIG. 7 is a cross section view of the tote transport taken along line 7-7 shown in FIG. 1 and shows a top plan view of the partition shown in FIG. 6.

Partition 26 includes an optional catch or is shaped to cooperate with an optional hanger 110 associated with an ice bucket disposed in container receptacle 100. As shown in FIG. 1, and ascertainable from a comparison of that which is shown in FIG. 4 and FIG. 6 and in FIG. 5 as compared to FIG. 7, upward directed facing side 94 of partition 26 generally corresponds to the shape of upwardly facing side 30 of base 22 with respect to the shape and orientation of the respective container receptacle 56, 100 such that similarly constructed containers can be engaged with either of base 22 or partition 26. As alluded to above, the orientation of projections 60, 62 and protrusions 102, 104 rotationally index ice containers associated with base 22 or partition 26 relative to handle assembly 24 and any handle or carrying structures associated with the respective containers. Such indexing improves the efficiency associated with user interaction with ice cart 20 inasmuch as users are able to quickly position containers on ice cart 20 in the appropriate orientation.

Figure 11:
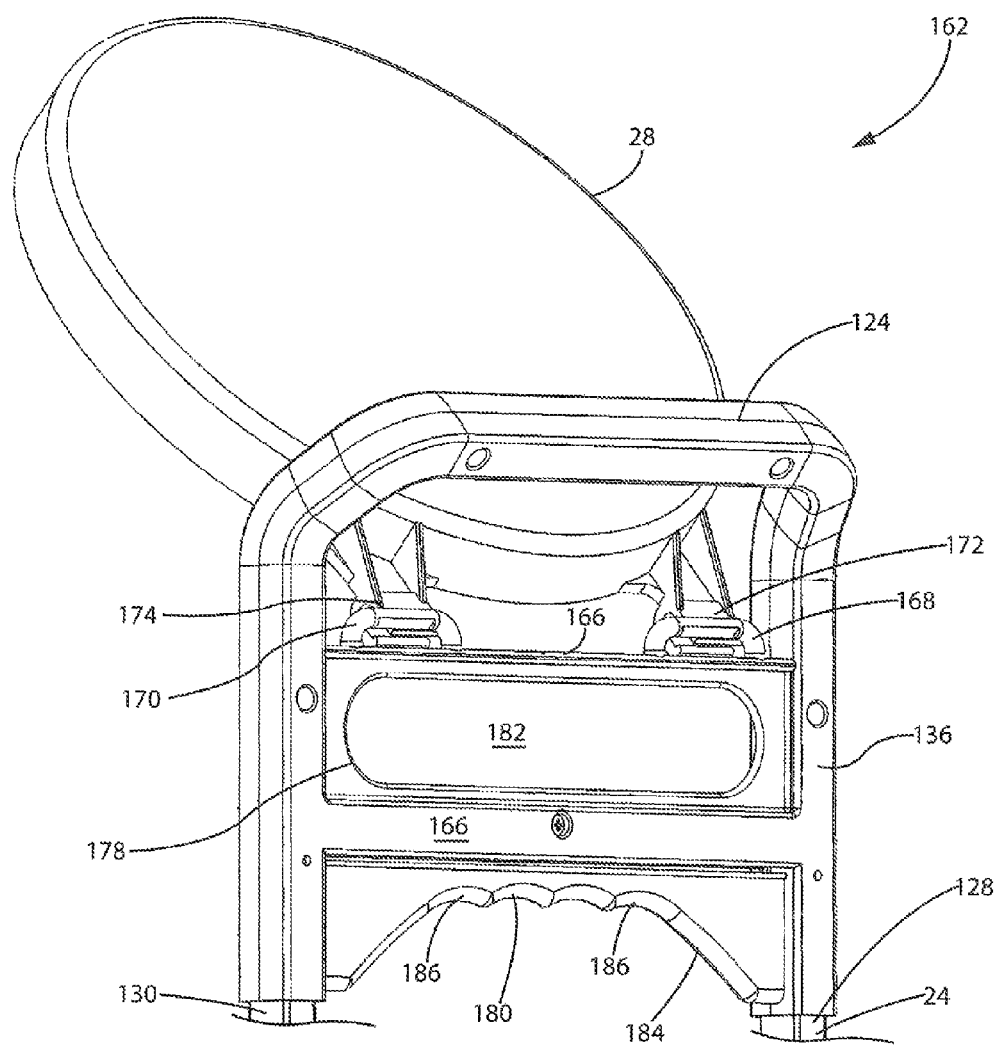
FIG. 11 is a view similar to FIG. 10 and is a detailed view of the lid of the tote transport shown in FIG. 9.

Partition 26 is offset from base 22 in a longitudinal direction, indicated by arrow 112, to facilitate the secure capture of a container between base 22 and downward facing side 92 of partition 26. Lid 28 is offset from partition 26 such that partition 26 is disposed generally between lid 28 and base 22. Referring to FIGS. 11 and 2, lid 28 includes a top surface 114 and a downward facing surface 116 that faces toward partition 26. Lid 28 defines a perimeter edge 118 that includes a lip 120 that is also shaped to slidably cooperate with a respective ice container similar to lip 96 associated with partition 26 as explained further below with respect to FIGS. 12-15. Preferably, lip 96 sealingly cooperates with an open end of a container disposed there beneath. Lid 28 is offset along direction 112 to be proximate a top end of ice cart 20. A hold or grab 124 associated with handle assembly 24 is positioned proximate the top end of ice cart 20 and extends in a slightly rearward direction relative to a longitudinal axis associated with the elongate members of handle assembly 24 as described further below.

Figure 8:
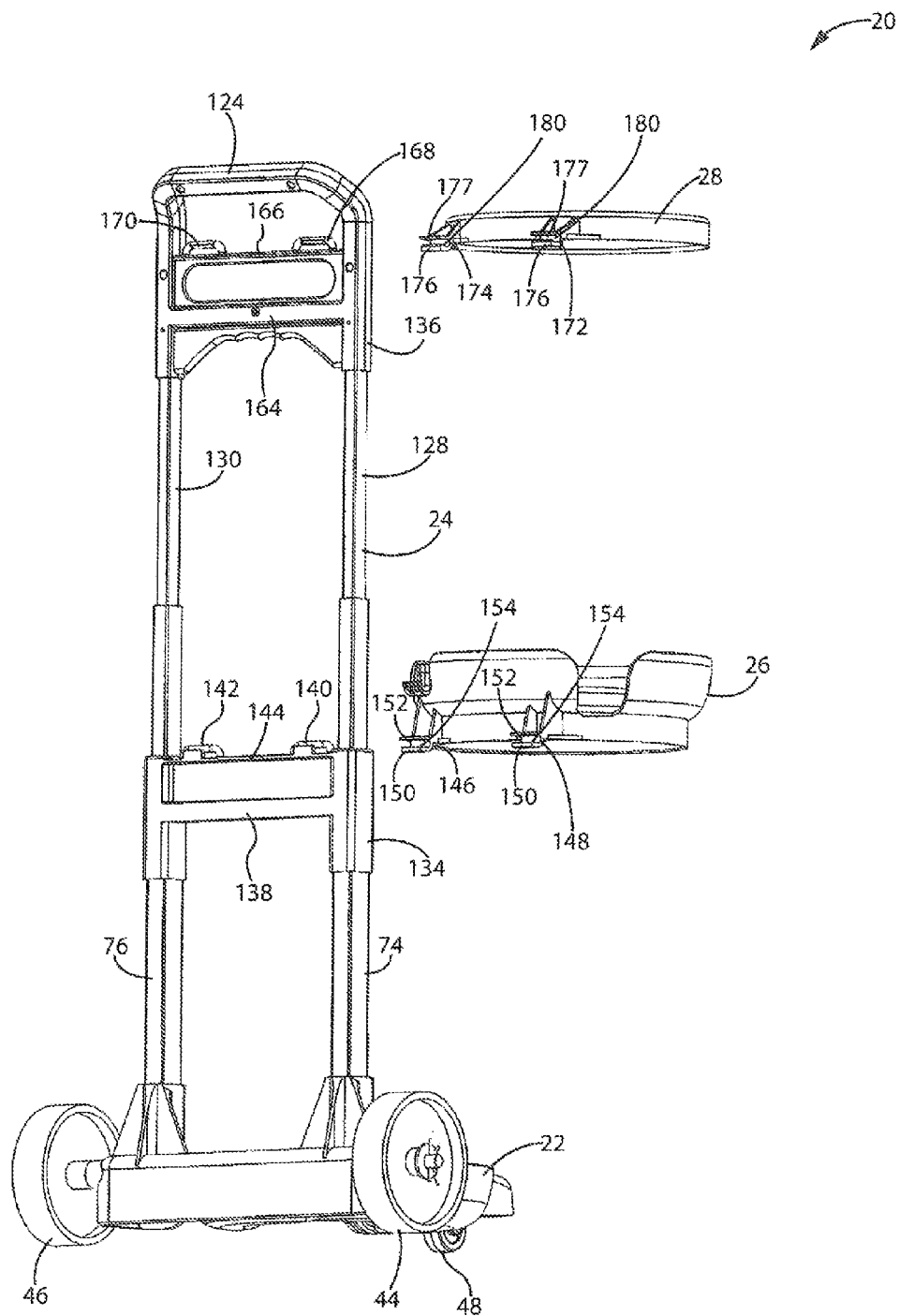
FIG. 8 is a rear perspective view of the tote transport shown in FIG. 1 with the partition and a lid exploded from a handle assembly.

Referring to FIGS. 1, 6, and 8, handle assembly 24 includes a plurality of tubular portions 74, 76, 128, 130 that extend between base 22 and grab 124. Tubular portions 74, 128 and 76, 130 preferably slidably cooperate with one another in a telescopic manner to allow handle assembly 24 to be collapsed into a smaller vertical footprint when ice cart 20 is not in use. One or more catches or buttons 132, 133 are disposed along the longitudinal interface between tubular portions 74, 128 and 76, 130 to provide a selectively lockable interaction of the telescopic association between the respective tubular members when handle assembly 24 of ice cart 20 such that handle assembly 24 can be conveniently configured between a stored orientation and an extended position or orientation suitable for use of ice cart 20 as shown in FIG. 1. It is appreciated that alternate numbers, shapes, and orientations of tubular portions 74, 76, 128, 130 and locking mechanisms can be provided to facilitate collapsing of handle assembly 24 for storage of ice cart 20 or to provide an adjustable compact orientation of handle assembly 24. It is further envisioned that handle assembly 24 could include one of more catches or buttons like buttons 132, 1133 to allow removal of handle assembly 24 from bosses 66, 68 of base 22 for storage or packaging purposes.

Figure 9:
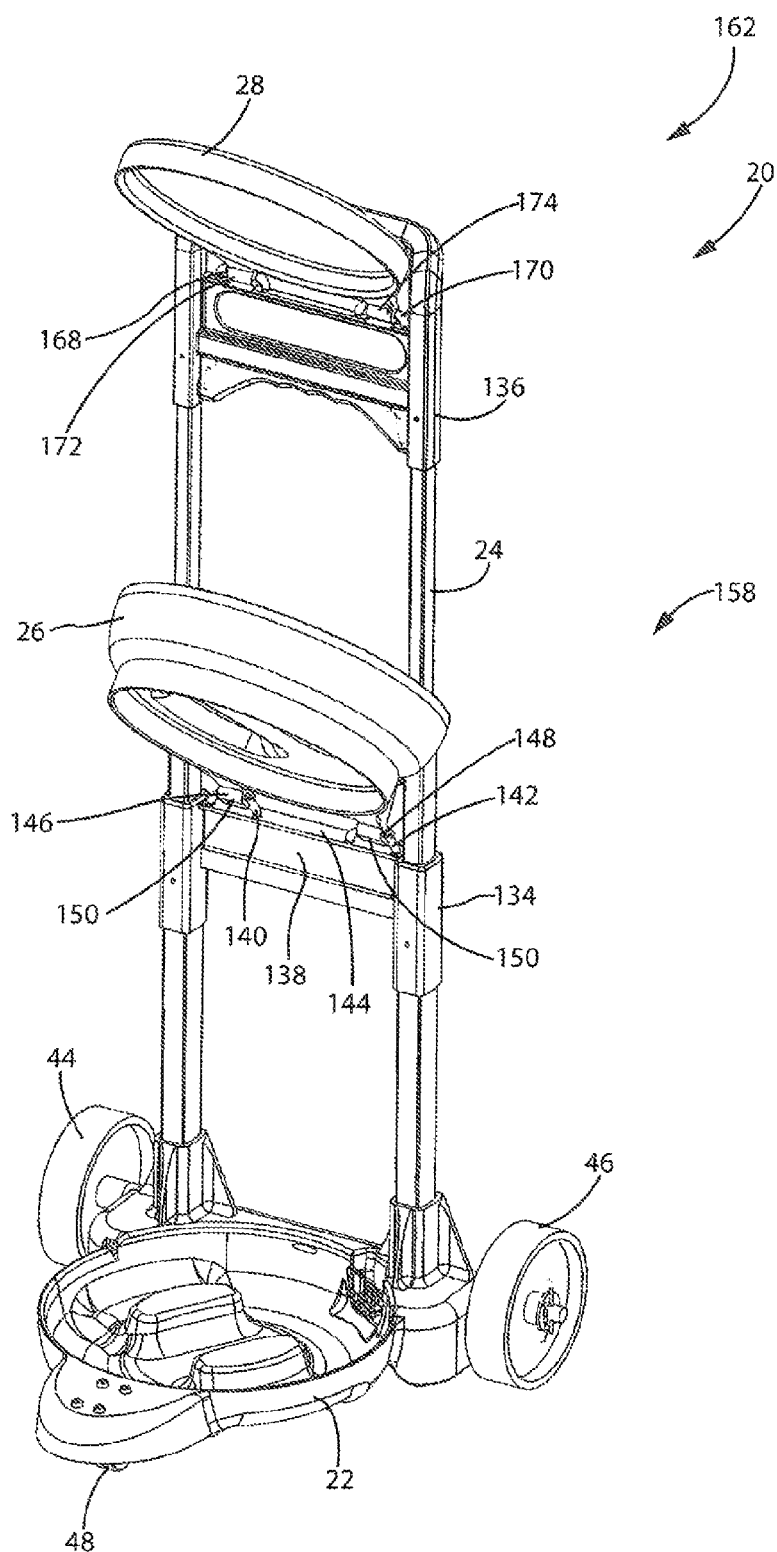
FIG. 9 is a view similar to FIG. 1 and shows the lid and partition rotated to a second position relative to the handle.

Referring to FIGS. 1, 8, and 9, handle assembly 24 includes a first crossbar 134 and a second crossbar 136 that extend laterally relative to the longitudinal orientation of tubular portions 74, 128 and 76, 130. First crossbar 134 is constructed to secure partition 26 to handle assembly 24 whereas crossbar 136 is constructed to secure lid 28 relative to handle assembly 24. As shown in FIGS. 8 and 9, crossbar 134 includes a center portion 138 that includes a first hinge 1140 in the second hinge 142 that are associated with an upper surface 144 of crossbar 134. First hinge 140 and second hinge 142 are shaped and positioned to cooperate with a first tab 146 and a second tab 148 that extend in a rearward direction from partition 26. First tab 146 and second tab 148 each include a first arm 150 and a second arm 152 that extend in a rearward direction from partition 26 and define a passage 154 that is shaped to receive a respective hinge 140, 142 associated with crossbar 134. Preferably, arms 150, 152 are shaped to snap-fittingly cooperate with a respective hinge 140, 142 such that partition 26 can be pivotably secured to handle assembly 24.

Figure 10:
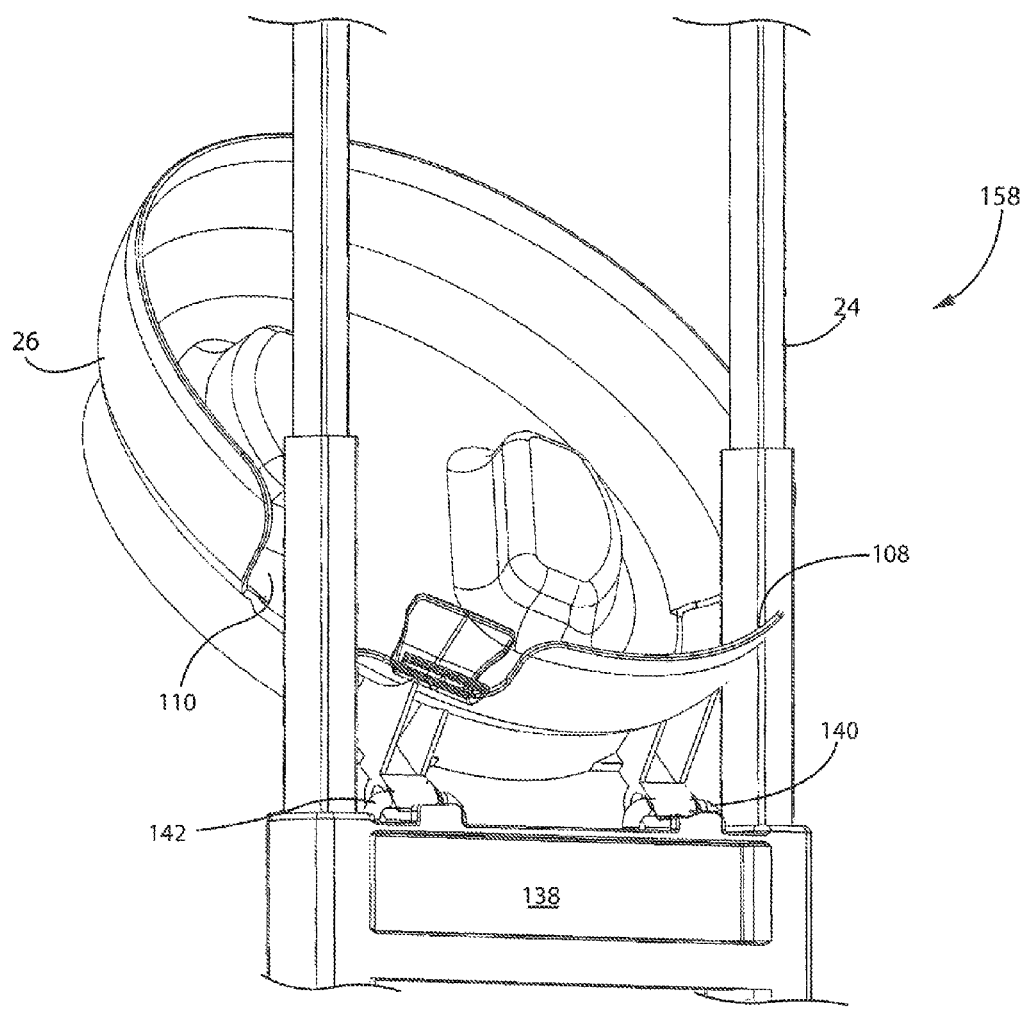
FIG. 10 is a rear perspective detailed view of the partition of the tote transport shown in FIG. 9.

Referring to FIGS. 1 and 9, partition 26 is movable or pivotable between a first position or orientation 156, as shown in FIG. 1, and a second position or orientation 158, as shown in FIGS. 9 and 10. When in the first orientation 156, partition 26 extends in a generally forward transverse direction relative to the longitudinal axis 112 associated with handle assembly 24. Partition 26 can rotate or pivot relative to handle assembly 24 via manipulation of the orientation of partition 26 relative to hinges 140, 142. When in the second orientation 158, as shown in FIGS. 9 and 10, partition 26 rotates about hinges 140, 142 in a generally upward and rearward direction relative to handle assembly 24.

As shown in FIG. 10, optional cutouts 108, 110 of partition 26 allow a portion of partition 26 proximate hinges 140, 142 to generally overlie respective portions of the tubular members of handle assembly 24 and facilitate a greater degree of relative rotation of partition 26 relative to handle assembly 24 while maintaining close proximity of the load associated with ice cart 20 relative to handle assembly 24. Alternatively, it is envisioned that tabs 146, 148 could be elongated in the rearward direction relative to partition 26 but it is appreciated that such a construction would offset the load associated with ice cart 20 in a forward direction away from handle assembly 24 and detract from the compact nature of the same.

Lid 28 also cooperates with handle assembly 24 in a pivotable manner similar to partition 26. Referring to FIGS. 1, 8, 9, and 11, lid 28 is pivotably attached to handle assembly 24 and movable between a first orientation 160, as shown in FIG. 1, and a second orientation 162, as shown in FIG. 9, Lid 28 is pivotably connected to a center portion 164 of crossbar 136. An upper surface 166 of center portion 164 of crossbar 136 includes a first hinge 168 and a second hinge 170. As shown in FIG. 8, lid 28 includes a first tab 172 and second tab 174 that each extend in a generally rearward direction from lid 28. Each tab 172, 174 is defined by first arm 176 and a second arm 177 that are positioned to define a passage 180 that is shaped to cooperate with a respective hinge 168, 170 associated with crossbar 136.

Referring to FIGS. 9 and 11, handle or grab 124 is oriented generally rearward of a plane that contains elongate tubular members 128, 130 and crossbar 136 of handle assembly 24 to allow a more inclined orientation of lid 28 relative to handle assembly 24 than were grab 124 oriented in a common plane associated with crossbar 136 of handle assembly 24. Understandably, tabs 172, 174 could be elongated to allow a similar degree of rotation of lid 28 relative to handle assembly 24 but similar to partition 26, such a construction would offset the load of ice cart 20 in a forward direction relative to handle assembly 24 and detract from the compact nature of the same.

Referring to FIGS. 9 and 11, crossbar 136 includes one or more grip sites or grips 178, 180 that are shaped cooperate with a hand of the user of ice cart 20. Grip 178 is defined by a window 182 generally defined by center portion 164 of crossbar 136 and shaped to tolerate either an overhand or underhand interaction with a hand of a user. Grip 180 is defined by a downward facing edge 184 of center portion 164 of crossbar 136 and includes one or more finger contours or slots 186. Grip 180 is shaped to allow underhand interaction of the hand of the user with grip site 180 of crossbar 136. Grab 124 and grips 178, 180 are oriented to allow two-handed interaction with handle assembly 24 of ice cart 20 during the use thereof. The generally rearward orientation of grab 124 relative to the plane associated with tubular members 128, 130 and crossbar 136 preferably allows the full pivotable manipulation of lid 28 relative to handle assembly 24 independent of engagement of a hand of a user therewith.

FIGS. 12-15 show various views of ice cart 20 with a first ice bin, tote or bucket 188 and a second ice bin, tote, or bucket 190 engaged therewith. Ice bucket 188 includes a bottom end 192 that is shaped to cooperate with upward facing side 30 of base 22 and an open top end 194 that is shaped cooperate with lid portion 88 of partition 26. Ice bucket 188 includes an optional handle 196 and an optional hanger 198 that are pivotably connected to bosses 200, 202 positioned proximate open end 194 and oriented on generally opposite sides of bucket 188.

Ice bucket 190 has, a construction that is substantially the same as ice bucket 188 and includes a bottom end 204 that is shaped to cooperate with base portion 90 of partition 26 and an open top end 206 that is shaped to cooperate with lid 28. Bucket 190 also includes an optional handle 208 and hanger 210 that are preferably pivotably attached to bucket 190 proximate open end 206 thereof. When positioned on ice cart 20, it should be appreciated that bucket 188 and bucket 190 are oriented in a generally stacked vertical orientation and disposed within the footprint of base 22 and/or wheels 44, 46, 48.

Figure 12:
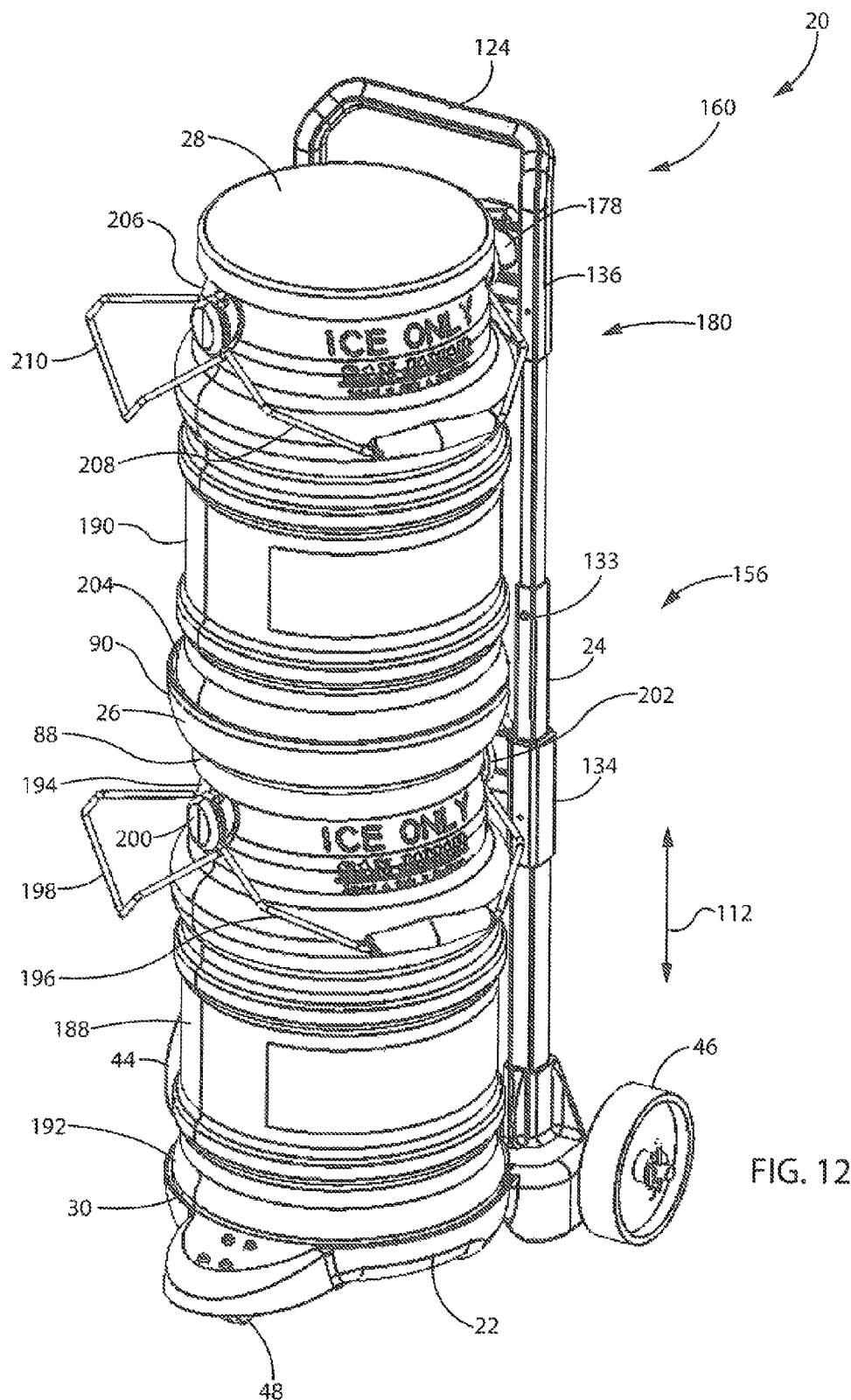
FIG. 12 is a view similar to FIG. 1 and shows a pair of ice buckets supported by the tote transport shown in FIG. 1.

Referring to FIGS. 9 and 12, during loading of ice cart 20, partition 26 is oriented in a pitched or rotated orientation 158 relative to handle assembly 24 such that bucket 188 can be engaged with base 22 without interference from partition 26. Partition 26 can subsequently be rotated toward the transverse orientation 156 such that lid portion 88 of partition 26 covers open end 194 of bucket 188 and extends about at least a portion of a radially or laterally directed portion of bucket 188 relative to longitudinal axis 112. The cooperation of base 22 and partition 26 with the opposite longitudinal ends of bucket 188 secures bucket 188 relative to cart 20.

Figure 13:
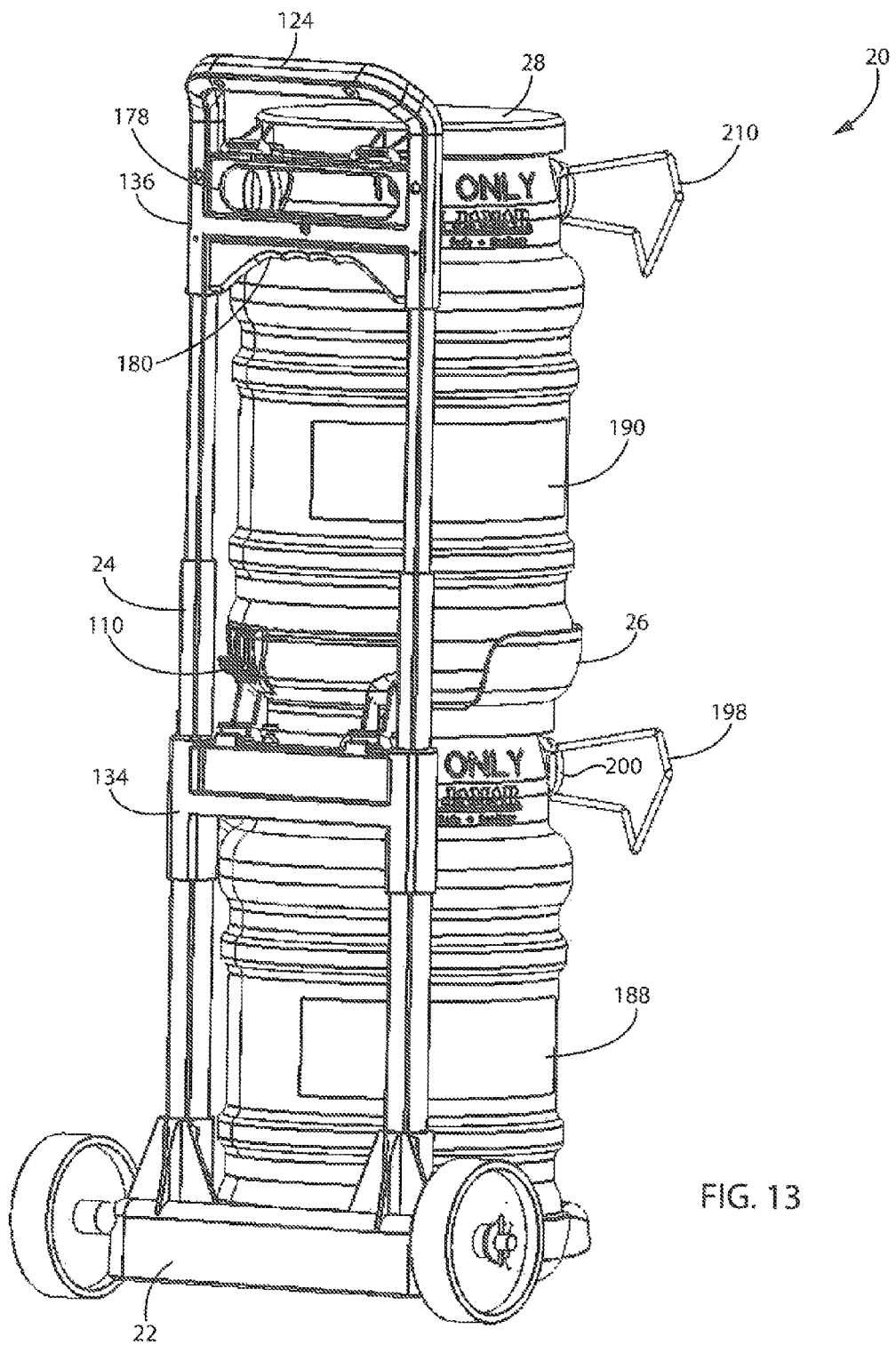
FIG. 13 is a rear side perspective view of the tote transport and ice buckets shown in FIG. 12.

With bucket 188 disposed between base 22 and partition 26 and lid 28 oriented in the pitched orientation 162 as shown in FIG. 9, bucket 190 can be engaged with base portion 90 of partition 26 so as to be disposed generally above bucket 188. Rotation of lid 28 toward the second or transverse orientation 160 as shown in FIGS. 12, 13 allows lid 28 to cooperate with the open end 206 of bucket 190 such that buckets 188, 190 are both securely captured between base 22 and lid 28 with partition 26 being disposed between buckets 188, 190. It should be appreciated that unloading ice cart 20 entails a reverse operation of the sequence of rotation of lid 28 and partition 26 and the removal of buckets 188, 190 as compared to that described above.

Figure 14:
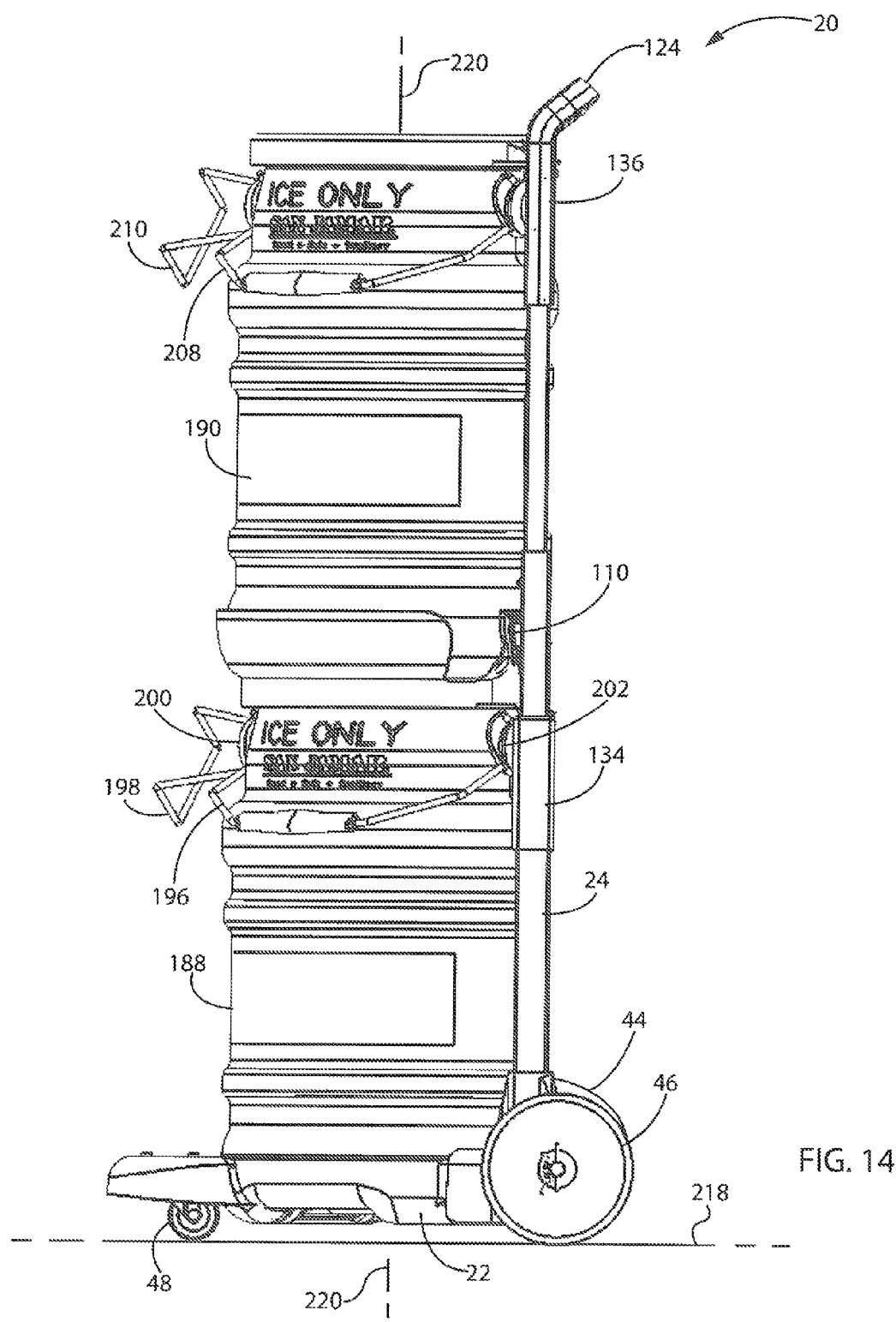
FIG. 14 is a side elevation view of the tote transport and ice buckets configuration shown in FIG. 12 in a first transportation orientation.
Figure 15:
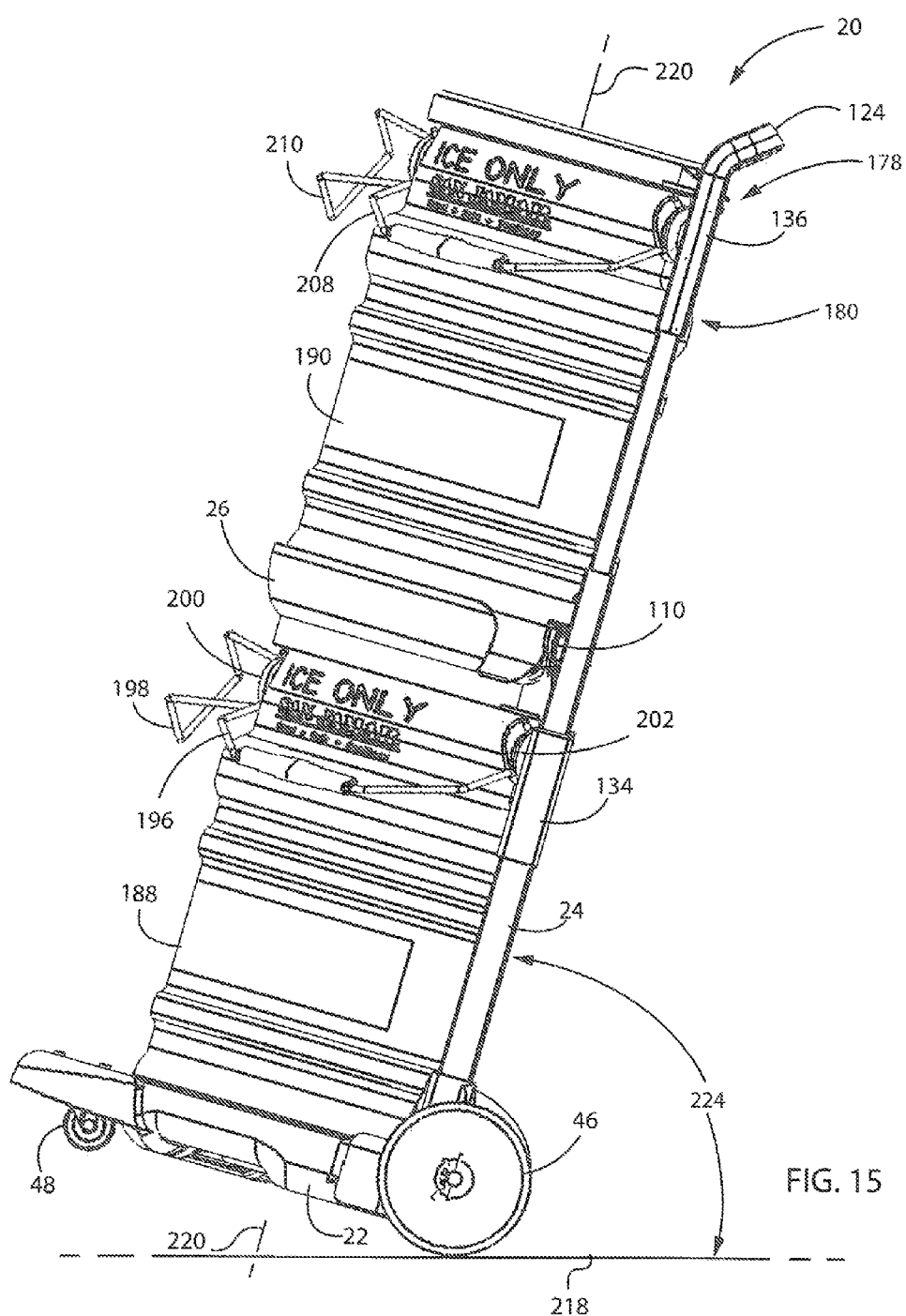
FIG. 15 is a view similar to FIG. 14 and shows the tote transport and ice buckets configuration in a second transportation orientation.

Referring to FIGS. 14 and 15, ice cart 20 is capable of two modalities of movement or conveyance of buckets 188, 190. As shown in FIG. 14, wheels 44, 46, 48 engage a floor surface 218 and are constructed such that bucket 188 and bucket 190 are disposed within the vertical footprint associated with the contact of wheels 44, 46, 48 with floor surface 218 such that ice cart 20 is movable in the substantially vertical orientation shown in FIG. 14. Swivel caster 48 allows rotation of ice cart 20 about a generally vertical axis 220 of the loaded cart configuration wherein the vertical axis 220 is disposed within the confines of a perimeter defined by wheels 44, 46, 48. Such a configuration ensures that the entirety of the weight associated with loaded ice cart 20 is borne by wheels 44, 46, 48 such that the user need only impart directional force to the ice cart 20 to effectuate its movement. Such a manipulation is particularly useful for use of ice cart 20 in cramped or crowded operational environments or by personnel who may have difficulty tipping and maneuvering a loaded ice cart 20 as described further below with respect to FIG. 15.

As shown in FIG. 15, when space is available and the user is physically capable of doing so, ice cart 20 can be tipped or pitched, indicated by arrow 224, in a rearward direction toward handle assembly 24. When in the pitched orientation, caster wheel 48 is offset from, floor surface 218 such that the load associated with ice cart 20 is primarily borne by wheels 44, 46 and only partly borne by the user. It should be appreciated that the orientation shown in FIG. 15, as compared to FIG. 14, places a greater load upon the user to effectuate movement of loaded ice cart 20 wherein a least a portion of the weight associated with the loaded cart is borne by the user. The cooperation of ice bucket 188 between base 22 and partition 26 and the cooperation of ice bucket 190 between partition 26 and lid 28 provides for a secure interaction of buckets 188, 190 relative to ice cart 20 to prevent shifting of buckets 188, 190 relative to ice cart 20 during such a pitched orientation. The sealed cooperation with partition 26 with the open end of ice bucket 188 and the sealed cooperation of lid 28 with the open end of ice bucket 190 prevents inadvertent, spilling of the contents of ice buckets 188, 190 during both vertical and tipped translation of ice cart 20 even if ice cart 20 is used to convey of materials such as liquids.

It is further appreciated that the transfer of loaded ice cart 20 between the bulk source and distribution sites may periodically require repeated orientation of ice cart 20 from the pitched orientation shown in FIG. 15 to the more vertical orientation shown in FIG. 14 as a function of the spatial requirements commonly dictated by the travel path associated with such activities. Whereas the vertical orientation shown in FIG. 14 may prove useful for navigation associated with tight quarters and/or around corners or effectuating turns, the pitched orientation of ice cart 20 as shown in FIG. 15, for those users capable of achieving such an orientation, may prove more expedient for those portions of the travel path associated with a straight direction of travel of ice cart 20.

Figure 16:
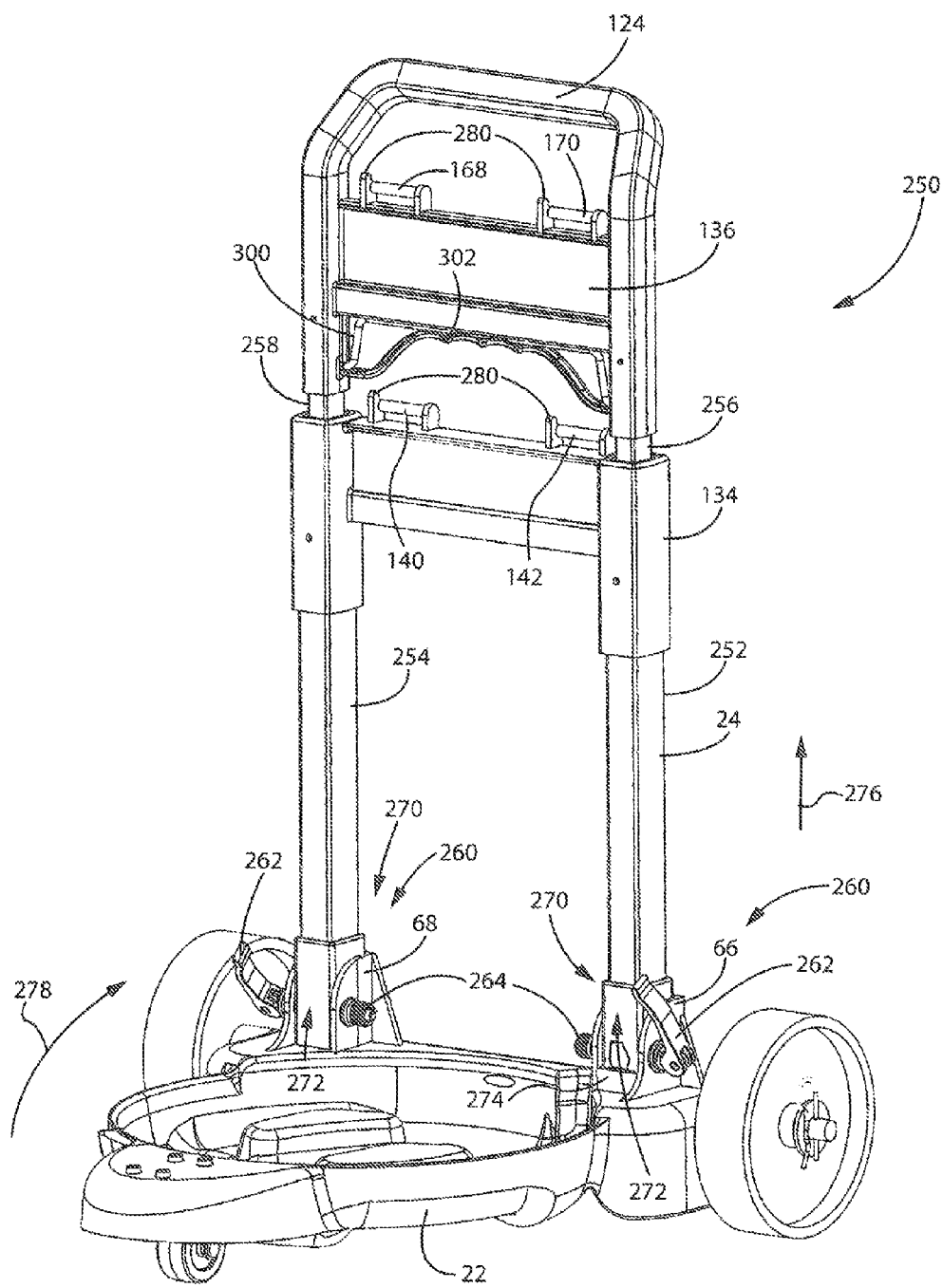
FIGS. 16-18 show various views of a tote transport according to another embodiment of the invention.
Figure 17:
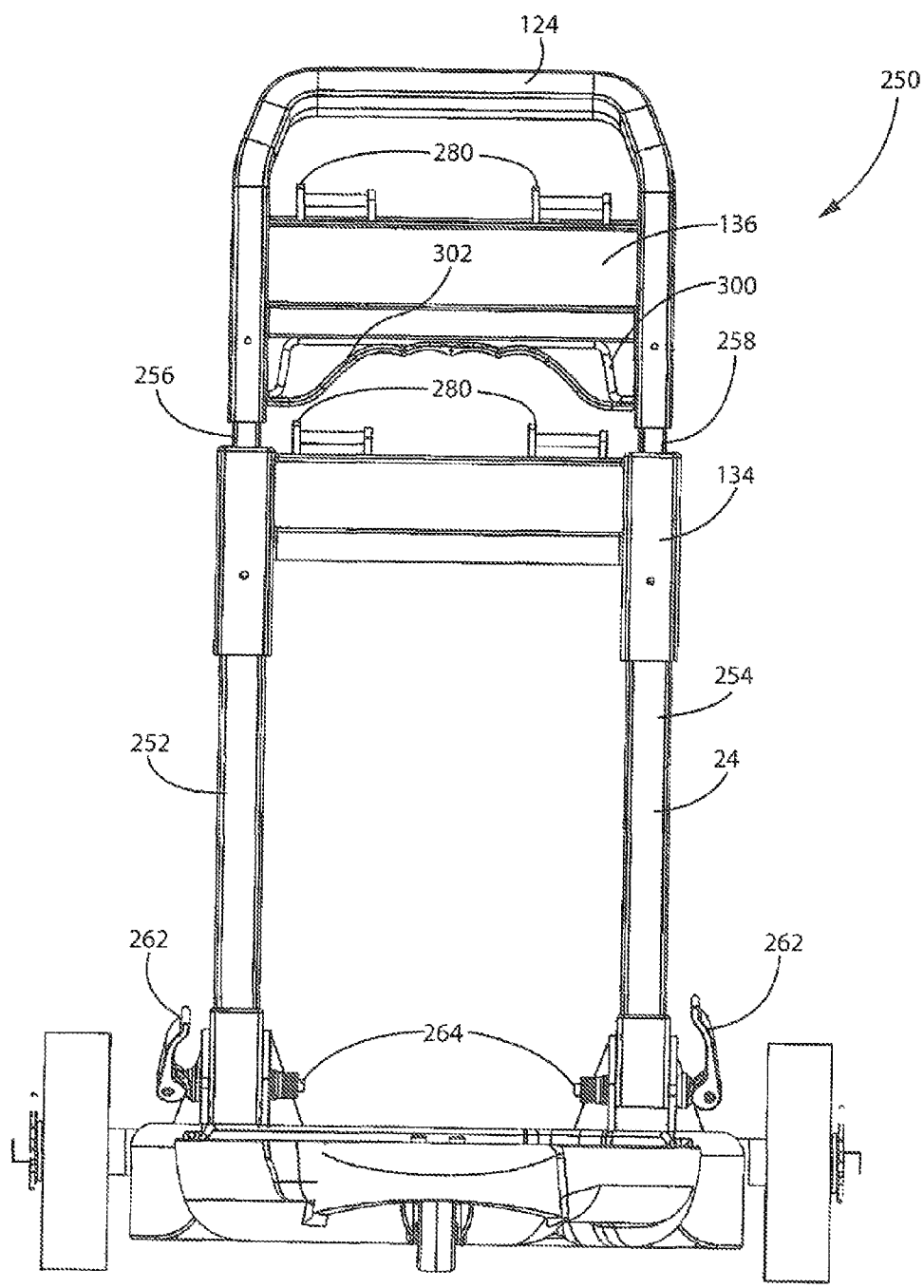
Figure 18:
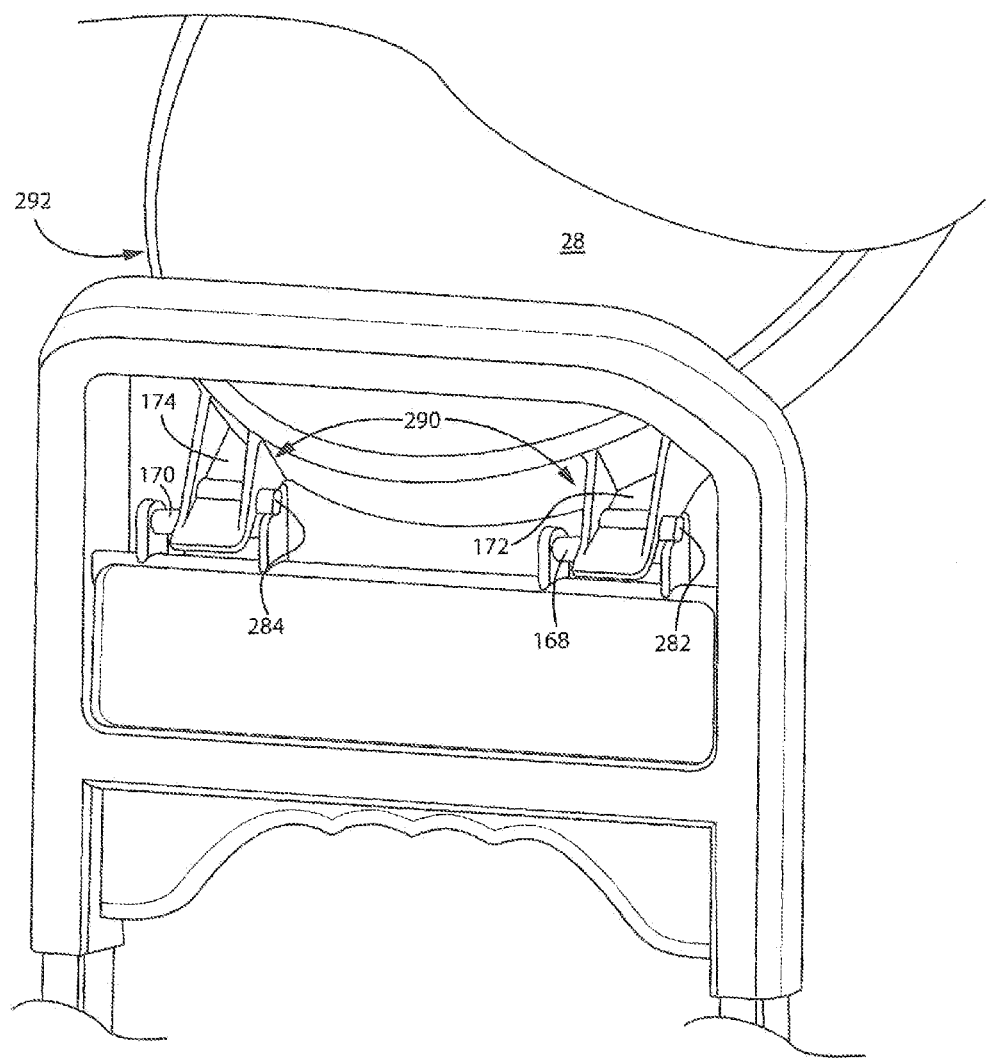

FIGS. 16-18 show an ice cart 250 according to another embodiment of the present invention. It should be appreciated that ice cart 250 includes a construction somewhat similar to ice cart 20 but includes various features that are unique thereto. It is appreciated that one or more of the features discussed below could be conveniently integrated with ice cart 20. For clarity, similar numbers have been used to designate the similar structures associated with ice carts 20, 250.

Ice cart 250 includes a telescopic handle assembly 24 that includes a number of slidably translatable or telescopically associated elongated members to 252, 254, 256, 258 and respective cross members 134, 136 that extend laterally therebetween. Handle assembly 24 is pivotably connected to base 22 of ice cart 250 by one or more adjustable connection mechanisms 260 as alluded to above with respect ice cart 20. Preferably, mechanisms 260 include a quick release lever 262 is connected to a skewer 264 that passes through alternate sides of a respective boss 66, 68 associated with base 22.

Preferably, a bottom end 270 of elongate members 252, 254 each include an elongate opening or slot associated with cooperation of a respective skewer 264. Bosses 66, 68 preferably include an open front portion 272 and at least one of bosses 66, 68 can include an optional a stop 274 that is shaped to slidably cooperate with a bottom end 270 of one of elongate members 252, 254. When closure mechanisms 260 are opened or loosened, handle assembly 24 can be translated in a slightly upward direction, indicated by arrow 276, via the elongated slots mentioned above, such that a lower distal end of elongate member 252 is disposed generally above stop 274 such that base 22 can be rotated in a generally upward direction, indicated by arrow 278, relative to elongate members 252, 254 of handle assembly 24 to provide a compact orientation of ice cart 250 when not in use.

Referring to FIGS. 16-18, ice cart 250 also includes one or more of hinges 140, 142, 168, 170 that are constructed to cooperate with a partition 26 and a lid 28, respectively. One or more of hinges 140, 142, 168, 170 include a catch 280 that is shaped to provide an interfering interface with a respective partition 26 or a lid 28 engaged therewith. Referring to FIG. 18, lid 28 can include one or more projections 282, 284 that cooperate with a corresponding catch 280 to maintain lid 28 in an inclined orientation relative to ice cart 250 so that lid 28 can selectively maintain an "open" position relative to a container associated therewith. Ice cart 20 could include a similar construction.

A gap 290 is formed between a respective tab 172, 174 of lid 172, 174 and an associated corresponding hinge 168, 170 to facilitate lateral translation of lid 28 along hinges 168, 170. Lid 28 can be slid in first direction, indicated by arrow 292, to allow projections 282, 284 to translate rotationally past a corresponding catch 280 such that lid 28 can be rotated toward the transverse orientation with respect to handle assembly 24. Preferably, partition 26 and lid 28 each include similar catch and projection associations so that both partition 26 and lid 28 can independently maintain an "open" position relative to ice cart 250. It is appreciated that ice cart 20 could include similar functionality.

Ice cart 250 also includes an alternative means of collapsing the telescopic association of elongate members 252, 254, 256, 258. Cross member or cross bar 136 includes a wire frame member 300 that is associated with an actuator 302 such that the wire frame member 300 and actuator 302 each extend in the lateral direction between the elongated members of the handle assembly 24 of ice cart 250. Actuator 302 is movable in a vertical direction to effectuate movement of wire frame member 300. Wire frame member 300 cooperates with a rod disposed within the longitudinal members of handle assembly 24 such that actuation of actuator 302 translates the rod in the longitudinal direction and allows catches or buttons like catches or buttons 132, 133 of ice catch 20 to selectively disengage from an interfering association with the telescopic members of handle assembly 24. That is, actuation of actuator 24 allows handle assembly 24 to be collapsed in the longitudinal direction.

Upward translation of handle 124 relative to base 22 of ice cart 250 during an extension of handle assembly 24 allows the buttons or catches to automatically return to the interfering association. Preferably, the rod disposed within the elongated member of handle assembly 24 is biased in a direction away from actuation of actuator 302 such that, when handle assembly 24 is fully extended, actuation of actuator 302 is required to collapse the handle assembly and actuation of actuator 302 releases the catches or buttons associated with each of the elongate telescopic associations of handle assembly 24. It is appreciated that ice cart 20 could be provided with a similar collapsible handle assembly rather than individually operable catches such as catches or buttons 130, 132 as shown in FIG. 6.

Ice carts 20, 250 both provide a compact and collapsible assembly for manually conveying various materials wherein the containers of material securely and preferably sealably cooperate with the various structures of the cart assembly. The vertical orientation of the various containers being conveyed improves the compact aspects of the cart assembly. The multiple modes of use of ice carts 20, 250 allow the cart to convey an amount of material in a manner that is at least somewhat independent of the physical capabilities of a given user. Although ice cart assembly is shown as being constructed to convey two containers, it is envisioned that ice carts 20, 250 be configured to cooperate with other carts and/or be configured to accommodate multiple columns of containers to allow the transport of greater amounts of commodity during any given trip without increasing the width of the cart. When configured to cooperate with supplemental carts, it is envisioned that such ice carts can be connected by an articulated joint positioned proximate the caster wheel such that the multiple ice carts can be conveyed in the vertical orientation as shown in FIG. 14 by an individual user associated with the rearward most ice cart or via cooperation of forward and rearward positioned users.

Various aspects of the invention are described in detail with reference to the drawings, wherein like reference numerals represent like parts and assemblies throughout the several views. Reference to one embodiment does not limit the scope of the claims attached hereto. Additionally, any examples set forth in this specification are not intended to be limiting and merely set forth some of the many possible embodiments for the appended claims.

What we claim is:

1. A tote transport comprising:
   a base having an upper facing surface and downward facing surface;
   at least one axle engaged with the base;
   a first and a second wheel secured to the at least one axle;
   a handle secured to the base and extending in an upward direction away from the base;
   a first cap pivotably connected to the handle and having a first side that is shaped to cooperate with an open end of a first tote such that the first tote can be selectively captured between the upper facing surface of the base and the first side of the first cap when the first cap is in contact with the first tote; and
   a second cap pivotably connected to the handle at a location that is offset from the first cap, the second cap shaped to cooperate with an open end of a second tote such that the second tote can be selectively captured between the first cap and the second cap at a position vertically above the first tote when the second cap is in contact with the second tote.

2. The tote transport of claim 1 wherein a second side of the first cap has generally the same shape as the upper facing surface of the base.

3. The tote transport of claim 2 wherein each of the base and the first cap include at least one protrusion that is shaped to be received in a cooperating space formed in a bottom portion of a respective one of the first and second totes when the respective tote is positioned thereon.

4. The tote transport of claim 3 wherein the at least one protrusion is positioned to rotationally index the respective one of the first tote and the second tote relative to the handle so that the handle does not interfere with a tote handle when the respective one of the first tote and second tote are engaged with the respective one of the base and the first cap.

5. The tote transport of claim 2 wherein the first cap includes a plurality of cut outs formed in a radial edge of the first cap, each cut out being generally aligned with a respective vertical member of the handle.

6. The tote transport of claim 1 wherein the handle includes a plurality of vertical sections that telescopically cooperate with one another and allow the handle to collapse between an in-use orientation and a stowed orientation.

7. The tote transport of claim 6 wherein the handle includes a grab rail and a grip rail that are oriented transversely to the vertical sections, the grab rail being formed at an end of the handle and the grip rail being located proximate thereto.

8. A tote transport comprising:
   a telescopic handle assembly;
   a base secured to a lower end of the telescopic handle assembly;
   a plurality of wheels secured to the base such that the wheels support at least a portion of the base when the wheels are in contact with a floor surface and the telescopic handle assembly extends in a generally upward vertical direction relative to the base;

a top surface of the base shaped to cooperate with a tote; and a lid that pivotably cooperates with the telescopic handle assembly to be movable between a first position and a second position, the lid having a first surface that faces the base such that the lid and the base cooperate with a tote such that the tote can be engaged with or removed from the base when the lid is oriented in one of the first position and the second position and at least a portion of the lid transversely a plane defined by an opening of the tote supported by the base and is oriented to support another tote above the lid when the lid is oriented in the other of the first position and the second position.

9. The tote transport of claim 8 further comprising a second lid that pivotably cooperates with the telescopic handle assembly at a location that is offset longitudinally along the telescopic handle from the lid, the second lid being movable between a first position and a second position and shaped to cooperate with an opening of the another tote disposed between the lid and the second lid.

10. The tote transport of claim 9 wherein the second lid has a radial perimeter shape that is generally the same as a radial perimeter shape associated with the first surface of the lid.

11. The tote transport of claim 10 further comprising a lip that extends in a radially inward direction relative to the radial perimeter shape of each of the lid and second lid, respectively, the lip being shaped to sealingly cooperate with an open end of one of the tote and another tote.

12. The tote transport of claim 8 further comprising a grab bar formed at an upper end of the telescopic handle assembly.

13. The tote transport of claim 12 further comprising a pip site formed by a cross member of the telescopic handle assembly proximate the grab bar.

14. The tote transport of claim 13 wherein interaction with the grip site deactivates a catch to collapse the telescopic handle assembly.

15. The tote transport of claim 8 wherein the tote transport has at least two wheels and at least one of a support post and another wheel wherein the tote transport is transportable in both a vertical orientation wherein the at least two wheels and the at least one of the support post and another wheel are engaged with the floor surface and a pitched orientation wherein the at least two wheels are engaged with the floor surface and the at least one of the support post and the another wheel are offset in a vertical direction relative to the floor surface.

16. The tote transport of claim 8 wherein the top surface of the base and a top surface of the lid each include a plurality of protrusions that are shaped to cooperate with a cooperating detent formed in a bottom portion of a respective one of the tote and the another tote engaged therewith.

17. A cart assembly that removably cooperates with a plurality of totes, the cart assembly comprising:
   a base having a plurality of wheels;
   a handle that extends in an upward direction from the base;
   a lid that cooperates with the handle and is offset from the base;
   a partition that cooperates with the handle and defines a rover for a first container disposed between the base and the partition and another base for supporting a second container disposed between the partition and the lid so that the partition overlaps a portion of the first container and the second container in a longitudinal direction that is parallel to the upward direction to restrain the first container and the second container in a stacked orientation that extends in the longitudinal direction along the handle between the base and the lid when the partition is disposed between the first container and the second container.

18. The cart assembly of claim 17 wherein the plurality of wheels is further defined as one of at least three wheels wherein one of the wheels is a caster wheel and at least two wheels wherein the cart assembly includes at least one support post offset from the at least two wheels.

19. The cart assembly of claim 17 wherein the handle is telescopic relative to the base.

20. The cart assembly of claim 17 wherein the partition is pivotably connected to the handle and is movable between a first position and a second position, the partition further comprising a pair of notches that are formed in a radial edge of the partition and are oriented to overlap the handle when the partition is in one of the first position and the second position.

* * * * *

UNITED STATES PATENT AND TRADEMARK OFFICE
CERTIFICATE OF CORRECTION

PATENT NO.        : 9,580,096 B2
APPLICATION NO.   : 14/773972
DATED             : February 28, 2017
INVENTOR(S)       : Aaron Beaver et al.

It is certified that error appears in the above-identified patent and that said Letters Patent is hereby corrected as shown below:

In the Claims

Claim 8, Column 13, Line 10, Replace "transversely" with "intersects".

Claim 13, Column 13, Line 33, Replace "pip" with "grip".

Claim 17, Column 14, Line 19, Replace "rover" with "cover".

Signed and Sealed this
Twelfth Day of September, 2017

Joseph Matal
*Performing the Functions and Duties of the
Under Secretary of Commerce for Intellectual Property and
Director of the United States Patent and Trademark Office*